United States Patent
Ng et al.

(10) Patent No.: US 12,509,540 B2
(45) Date of Patent: Dec. 30, 2025

(54) DEVELOPMENT OF NOVEL NEUTRAL LAYER AND HYDROPHOBIC PINNING MAT MATERIALS FOR USE IN DSA WITH IMPROVED SUBSTRATE COMPATIBILITY

(71) Applicant: Merck Patent GmbH, Darmstadt (DE)

(72) Inventors: Edward W. Ng, Belle Mead, NJ (US); Durairaj Baskaran, Bridgewater, NJ (US)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/711,795

(22) PCT Filed: Nov. 30, 2022

(86) PCT No.: PCT/EP2022/083791
§ 371 (c)(1),
(2) Date: May 20, 2024

(87) PCT Pub. No.: WO2023/099534
PCT Pub. Date: Jun. 8, 2023

(65) Prior Publication Data
US 2025/0034306 A1   Jan. 30, 2025

Related U.S. Application Data

(60) Provisional application No. 63/322,334, filed on Mar. 22, 2022, provisional application No. 63/264,797, filed on Dec. 2, 2021.

(51) Int. Cl.
*C08F 220/14* (2006.01)
*C08F 212/08* (2006.01)
(Continued)

(52) U.S. Cl.
CPC .......... *C08F 220/14* (2013.01); *C08F 212/08* (2013.01); *C08F 212/12* (2013.01);
(Continued)

(58) Field of Classification Search
CPC .... C08F 220/14; C08F 212/08; C08F 212/12; C08F 2800/10; C08F 2810/20;
(Continued)

(56) References Cited

U.S. PATENT DOCUMENTS 9,574,104 B1 * 2/2017 Kim ................... H01L 21/0273
9,828,518 B2   11/2017 Hustad et al.
(Continued)

FOREIGN PATENT DOCUMENTS

WO         2023099534 A1    6/2023

OTHER PUBLICATIONS

A. Deiter Shluter et al., Block Copolymers by Multi-Mode Polymerizations, Synthesis of Polymers, 2014, vol. 1, p. 315.
(Continued)

*Primary Examiner* — Alicia Bland
(74) *Attorney, Agent, or Firm* — EMD Performance Materials Corp.

(57) ABSTRACT

The invention relates to a random copolymer of structure (A) comprising, a carboxylic acid bearing repeat of structure (I), a 4-vinylbenzocyclobutene derived repeat unit of structure of structure (II), a styrenic repeat unit of structure (III), an alkyl acrylate or alkyl 2-methylenealkanoate derived repeat unit of structure (IV), a hydroxy functionalized alkyl acrylate or alkyl 2-methylenealkanoate derived repeat unit of structure (V), and two end groups as shown in structure (A) one of which is H and the other is a methyl moiety substituted with Rr, $Rr_1$ and $Rr_2$, wherein $Rr_1$, is a C-1 to C-8 alkyl, $Rr_2$ is selected from a C-1 to C-8 alkyl, a C-1 to C-8 alkylene hydroxy moiety (-alkylene-OH), a C-1-C-8 alkylenecarboxylic acid moiety (-alkylene-$CO_2H$), or a benzylic alcohol comprising moiety of structure (B), Rr is a cyano moiety (—CN) or a carbonylalkyl moiety (—C(=O)—Ri), wherein Ri is a C-1 to C-8 alkyl or an aryl moiety.

40 Claims, 19 Drawing Sheets where A = 0.30-0.60, B = 0.15-0.35, C = 0.15-0.45, D = 0.01-0.05, E = 0.01-0.03

(51) Int. Cl.

| | | |
|---|---|---|
| *C08F 212/12* | (2006.01) | |
| *C09D 125/14* | (2006.01) | |
| *C09D 125/16* | (2006.01) | |
| *C09D 133/06* | (2006.01) | |
| *C30B 19/12* | (2006.01) | |
| *C30B 29/58* | (2006.01) | |

(52) U.S. Cl.
CPC ......... *C09D 125/14* (2013.01); *C09D 125/16* (2013.01); *C09D 133/062* (2013.01); *C30B 19/12* (2013.01); *C30B 29/58* (2013.01); *C08F 2800/10* (2013.01); *C08F 2810/20* (2013.01)

(58) Field of Classification Search
CPC .... C08F 212/32; C08F 212/22; C08F 220/20; C08F 220/26; C09D 125/14; C09D 125/16; C09D 133/062; C09D 125/08; C09D 133/066; C30B 19/12; C30B 29/58; G03F 7/0002
See application file for complete search history.

(56) References Cited

U.S. PATENT DOCUMENTS

| | | | |
|---|---|---|---|
| 2013/0078576 A1* | 3/2013 | Wu | C09D 125/16 |
| | | | 430/296 |
| 2019/0233636 A1 | 8/2019 | Xu | |
| 2019/0259607 A1* | 8/2019 | Janes | H01L 21/02118 |
| 2021/0230339 A1* | 7/2021 | Ng | C08F 220/14 |

OTHER PUBLICATIONS

Encyclopedia of Polymer Science and Technology, 2014, vol. 7, p. 625.

Jin, K.; Torkelson, J. M. et al. Enhanced Tg-Confinement Effect in Cross-Linked Polystyrene Compared to Its Linear Precursor: Roles of Fragility and ChainArchitecture, Macromolecules, 2016, 49, 5092-5103.

Liebig, D. et al., Energy Conversion and Green Energy Storage, J. Polym. Sci., 2020, 58(1), 181-192.

Nealey et al. Fabrication of Lithographically Defined Chemically Patterned PolymerBrushes and Mats, Macromolecules, 2011, 44, 1876-1885.

Rossner, C. et al., Staged Surface Patterning and Self-Assembly of Nanoparticles Functionalized with End-Grafted Block Copolymer Ligands PS-b-PVBA; Angewandte Chemie, 2019, 58(1), 181-192.

So, Y. H.; Hahn, S. F.; Li, Y.; Reinhard, M. T., J. et al., Styrene 4-Vinylbenzocyclobutene Copolymer for Microelectronic Applications Polym. Sci., Part A: Polym. Chem. 2008, 46, 2799-2806.

Wei, L.-H., et al.; Synthesis of a well-defined poly (p-vinyl benzoic acid) and its diblock copolymer with styrene, PS-b-PVBA, Abstracts of Papers, ACS National Meeting, 2002.

X. Guo, B. Choi et al. Polymer Synthesis with More Than One Form of Living Polymerization Method Macromol. Rapid Commun. 2018, 39, 1800479.

Y. Pang, X. Jin et al. Directed Self-Assembly of Styrene-Methyl Acrylate Block Copolymers with Sub-7 nm Features via Thermal Annealing, Macromolecules 2019, 52, 2987-2994.

International Search Report and Written Opinion, PCT/EP2020/083791, mail date Mar. 13, 2023.

* cited by examiner where R = -CH$_3$, -(CH$_2$)$_3$-OH, -(CH$_2$)$_2$COOH
and A = 0.30-0.60, B = 0.15-0.35, C = 0.15-0.45, D = 0.01-0.05 where A = 0.30-0.60, B = 0.15-0.35, C = 0.15-0.45, D = 0.01-0.05, E = 0.01-0.03

Representative $^1$H NMR spectra of P(S-r-VBCB-r-MMA-r-VBA)-OH

Representative ¹H NMR spectra of P(S-r-VBCB-r-MMA-r-VBA)-COOH

Representative ¹H NMR spectra of P(S-r-VBCB-r-MMA-r-HEMA-r-VBA)

Where R= -CH₃, -(CH₂)₃-OH, -(CH₂)₂-COOH

And X=0.90 -0.95, Y= 0.05-0.10, Z= 0.01-0.05

Representative ¹H NMR spectra of P(S-r-VBCB-r-VBA)-COOH

Representative $^1$H NMR spectra of P(S-r-VBCB-r-VBA)-OH

Defect Analysis SOL COMP 2 versus SOL 10 to SOL 16 coated on SiARC

Black: No alignment  Light Grey: Mostly aligned  Grey: Completely aligned

SOL COMP 2

| Dose (mj/cm2) | ADI CD | AEI CD | ADI-AEI | W/Lo |
|---|---|---|---|---|
| 7.5 |  | 51.14 |  |  |
| 8.5 |  | 47.85 |  |  |
| 9.5 |  | 40.41 |  |  |
| 10.5 | 56.6 | 34.49 | 22.11 | 1.15 |
| 11.5 | 52.6 | 30.95 | 21.65 | 1.03 |
| 12.5 | 48.8 | 28.72 | 20.08 | 0.96 |
| 13.5 | 45.8 | 26.23 | 19.57 | 0.87 |
| 14.5 | 43.1 | 24.39 | 18.71 | 0.81 |
| 15.5 | 40.5 | 22.27 | 18.23 | 0.74 |
| 16.5 | 38.8 | 20.83 | 17.97 | 0.69 |
| 17.5 | 36.9 | 19.22 | 17.68 | 0.64 |
| 18.5 | 37.5 | 17.7 | 19.8 | 0.59 |
| 19.5 | 35.6 | 16.19 | 19.41 | 0.54 |
| 20.5 | 34.6 | 14.89 | 19.71 | 0.50 |
| 21.5 | 33.6 | 13.86 | 19.74 | 0.46 |
| 22.5 | 33.4 | 12.38 | 21.02 | 0.41 |
| 23.5 | 32.2 | 12.98 | 19.22 | 0.43 |
| 24.5 | 31.4 | 11.13 | 20.27 | 0.37 |
| 25.5 | 31 | 11.96 | 19.04 | 0.40 |

SOL 15

| Dose (mj/cm2) | ADI CD | AEI CD | ADI-AEI | W/Lo |
|---|---|---|---|---|
| 7.5 | | 47.49 | | |
| 8.5 | | 48.38 | | |
| 9.5 | | 36.78 | | |
| 10.5 | 57.8 | 32.46 | 25.34 | 1.08 |
| 11.5 | 52.3 | 29.28 | 23.02 | 0.98 |
| 12.5 | 49.6 | 26.31 | 23.29 | 0.88 |
| 13.5 | 44.9 | 24.49 | 20.41 | 0.82 |
| 14.5 | 43.2 | 22.34 | 20.86 | 0.74 |
| 15.5 | 39.9 | 20.47 | 19.43 | 0.68 |
| 16.5 | 37.7 | 18.69 | 19.01 | 0.62 |
| 17.5 | 36.7 | 17.11 | 19.59 | 0.57 |
| 18.5 | 35.8 | 15.93 | 19.87 | 0.53 |
| 19.5 | 34.3 | 14.53 | 19.77 | 0.48 |
| 20.5 | 33.7 | 13.42 | 20.28 | 0.45 |
| 21.5 | 32.3 | 11.98 | 20.32 | 0.40 |
| 22.5 | 31.8 | 11.08 | 20.72 | 0.37 |
| 23.5 | 30.6 | 9.04 | 21.56 | 0.30 |
| 24.5 | 29.4 | 9.81 | 19.59 | 0.33 |
| 25.5 | 29 | 9.19 | 19.81 | 0.31 |

SOL 14

| Dose (mj/cm2) | ADI CD | AEI CD | ADI-AEI | W/Lo |
|---|---|---|---|---|
| 7.5 | | 48.57 | | |
| 8.5 | | 43.49 | | |
| 9.5 | | 36.59 | | |
| 10.5 | | 31.27 | | 1.04 |
| 11.5 | 52.2 | 28.12 | 24.08 | 0.94 |
| 12.5 | 48.7 | 25.47 | 23.23 | 0.85 |
| 13.5 | 45.1 | 23.33 | 21.77 | 0.78 |
| 14.5 | 42.3 | 21.29 | 21.01 | 0.71 |
| 15.5 | 38.4 | 19.7 | 18.7 | 0.66 |
| 16.5 | 37.2 | 18.01 | 19.19 | 0.60 |
| 17.5 | 36.4 | 16.57 | 19.83 | 0.55 |
| 18.5 | 35.1 | 14.9 | 20.2 | 0.50 |
| 19.5 | 34.5 | 13.67 | 20.83 | 0.46 |
| 20.5 | 32.9 | 12.14 | 20.76 | 0.40 |
| 21.5 | 31.8 | 10.35 | 21.45 | 0.35 |
| 22.5 | 30.5 | 9.77 | 20.73 | 0.33 |
| 23.5 | 29.4 | 9.14 | 20.26 | 0.30 |
| 24.5 | 28.7 | 9.33 | 19.37 | 0.31 |
| 25.5 | 28.6 | 9.85 | 18.75 | 0.33 |

(X) De-wet defects  (∇) Slight defects  (Δ)Very Slight defects  (O) No defects (A) Good C/H    (B) Partial C/H    (C) Poor C/H

DEVELOPMENT OF NOVEL NEUTRAL LAYER AND HYDROPHOBIC PINNING MAT MATERIALS FOR USE IN DSA WITH IMPROVED SUBSTRATE COMPATIBILITY

This application is a national stage application, filed under 35 U.S.C. § 371, of International Patent Application No. PCT/EP2022/083791, filed on Nov. 30, 2022, which claims the benefit of U.S. Provisional Patent Application No. 63/264,797, filed Dec. 2, 2021, and U.S. Provisional Patent Application No. 63/322,334, filed Mar. 22, 2022, and each of which application is incorporated herein by reference in their entirety.

The invention relates to a neutral layer and pinning mat composition for use in directed self-assembly processing.

BACKGROUND

Self-assembly of block copolymers is a method useful for generating smaller and smaller patterned features for the manufacture of microelectronic devices in which the critical dimensions (CD) of features on the order of nanoscale can be achieved. Self-assembly methods are desirable for extending the resolution capabilities of microlithographic technology for repeating features such as an array of contact holes or posts. In a conventional lithography approach, ultraviolet (UV) radiation may be used to expose through a mask onto a photoresist layer coated on a substrate or layered substrate. Positive or negative photoresists are useful, and these can also contain a refractory element such as silicon to enable dry development with conventional integrated circuit (IC) plasma processing. In a positive photoresist, UV radiation transmitted through a mask causes a photochemical reaction in the photoresist such that the exposed regions are removed with a developer solution or by conventional IC plasma processing. Conversely, in negative photoresists, UV radiation transmitted through a mask causes the regions exposed to radiation to become less removable with a developer solution or by conventional IC plasma processing. An integrated circuit feature, such as a gate, via or interconnect, is then etched into the substrate or layered substrate, and the remaining photoresist is removed. When using conventional lithographic exposure processes, the dimensions of features of the integrated circuit feature are limited. Further reduction in pattern dimensions is difficult to achieve with radiation exposure due to limitations related to aberrations, focus, proximity effects, minimum achievable exposure wavelengths and maximum achievable numerical apertures. The need for large-scale integration has led to a continued shrinking of the circuit dimensions and features in the devices. In the past, the final resolution of the features has been dependent upon the wavelength of light used to expose the photoresist, which has its own limitations. Directed (a.k.a. guided) self-assembly techniques, such as graphoepitaxy and chemoepitaxy using block copolymer imaging, which employ a patterned area on a substrate, are highly desirable techniques used to enhance resolution while reducing CD variation. These techniques can be employed to either enhance conventional UV lithographic techniques or to enable even higher resolution and CD control in approaches employing EUV, e-beam, deep UV or immersion lithography. The directed self-assembly block copolymer comprises a block of etch resistant copolymeric unit and a block of highly etchable copolymeric unit, which when coated, aligned and etched on a substrate give regions of very high-density patterns.

For directed (guided), or unguided self-assembly, of a block copolymer film, respectively, on a patterned or non-patterned substrate area, typically the self-assembly process of this block polymer layer occurs during annealing of this film overlying a neutral layer. This neutral layer over a semiconductor substrate may be an unpatterned neutral layer, or in chemoepitaxy or graphoepitaxy, this neutral layer may contain, respectively, graphoepitaxy or chemoepitaxy guiding features (formed through the above-described UV lithographic technique). During annealing of the block copolymer film, the underlying, neutral layer, directs the nanophase separation of the block copolymer domains. One example is the formation of phase separated domains which are lamellas or cylinders perpendicular to the underlying neutral layer surface. These nanophase separated block copolymer domains form a pre-pattern (e.g., line and space L/S) which may be transferred into the substrate through an etching process (e.g., plasma etching). In graphoepitaxy, or in chemoepitaxy, these guiding features may dictate both pattern rectification and pattern multiplication. In the case of an unpatterned neutral layer this produces a repeating array of for instance L/S or CH. For example, in a conventional block copolymer such as poly(styrene-b-methyl methacrylate (P(S-b-MMA)), in which both blocks have similar surface energies at the BCP-air interface, this can be achieved by coating and thermally annealing the block copolymer on a layer of non-preferential or neutral material that is grafted or cross-linked at the polymer-substrate interface.

In the graphoepitaxy directed self-assembly method, the block copolymers self organize around a substrate that is pre-patterned with conventional lithography (Ultraviolet, Deep UV, e-beam, Extreme UV (EUV) exposure source) to form repeating topographical features such as a line/space (L/S) or contact hole (CH) pattern. In an example of a L/S directed self-assembly array, the block copolymer can form self-aligned lamellar regions which can form parallel line-space patterns of different pitches in the trenches between pre-patterned lines, thus enhancing pattern resolution by subdividing the space in the trench between the topographical lines into finer patterns. For example, a diblock copolymer or a triblock copolymer which is capable of microphase separation and comprises a block rich in carbon (such as styrene or containing some other element like Si, Ge, Ti) which is resistant to plasma etch, and a block which is highly plasma etchable or removable, can provide a high-resolution pattern definition. Examples of highly etchable blocks can comprise monomers which are rich in oxygen, and which do not contain refractory elements and are capable of forming blocks which are highly etchable, such as methyl methacrylate. The plasma etching gases used in the etching process of defining the self-assembly pattern typically are those used in processes employed to make integrated circuits (IC). In this manner, very fine patterns can be created in typical IC substrates than were definable by conventional lithographic techniques, thus achieving pattern multiplication. Similarly, features such as contact holes can be made denser by using graphoepitaxy in which a suitable block copolymer arranges itself by directed self-assembly around an array of contact holes or posts defined by conventional lithography, thus forming a denser array of regions of etchable and etch resistant domains which when etched give rise to a denser array of contact holes. Consequently, graphoepitaxy has the potential to offer both pattern rectification and pattern multiplication.

In chemical epitaxy, or pinning chemical epitaxy, the self-assembly of the block copolymer is formed on a surface whose guiding features are regions of differing chemical affinity, having no, or insignificant topography (a.k.a. non-guiding topography) which predicates the directed self-assembly process. For example, the surface of a substrate could be patterned with conventional lithography (UV, Deep UV, e-beam, EUV) to create surfaces of different chemical affinity in a line and space (L/S) pattern in which exposed areas whose surface chemistry had been modified by irradiation alternate with areas which are unexposed and show no chemical change. These areas present no topographical difference but do present a surface chemical difference or pinning to direct self-assembly of block copolymer segments. Specifically, the directed self-assembly of a block copolymer whose block segments contain etch resistant (such as styrene repeat unit) and rapidly etching repeat units (such as methyl methacrylate repeat units) would allow precise placement of etch resistant block segments and highly etchable block segments over the pattern. This technique allows for the precise placement of these block copolymers and the subsequent pattern transfer of the pattern into a substrate after plasma or wet etch processing. Chemical epitaxy has the advantage that it can be fine-tuned by changes in the chemical differences to help improve line-edge roughness and CD control, thus allowing for pattern rectification. Other types of patterns such as repeating contact holes (CH) arrays could also be pattern rectified using chemoepitaxy.

These neutral layers are layers on a substrate or the surface of a treated substrate which have no affinity for either of the block segment of a block copolymer employed in directed self-assembly. In the graphoepitaxy method of directed self-assembly of block copolymer, neutral layers are useful as they allow the proper placement or orientation of block polymer segments for directed self-assembly which leads to proper placement of etch resistant block polymer segments and highly etchable block polymer segments relative to the substrate. For instance, in surfaces containing line and space features which have been defined by conventional radiation lithography, a neutral layer allows block segments to be oriented so that the block segments are oriented perpendicular to the surface of the substrates, an orientation which is ideal for both pattern rectification and pattern multiplication depending on the length of the block segments in the block copolymer as related to the length between the lines defined by conventional lithography. If a substrate interacts too strongly with one of the block segments it would cause it to lie flat on that surface to maximize the surface of contact between the segment and the substrate; such a surface would perturb the desirable perpendicular alignment which can be used to either achieve pattern rectification or pattern multiplication based on features created through conventional lithography. Modification of selected small areas or pinning of substrate to make them strongly interactive with one block of the block copolymer and leaving the remainder of the surface coated with the neutral layer can be useful for forcing the alignment of the domains of the block copolymer in a desired direction, and this is the basis for the pinned chemoepitaxy or graphoepitaxy employed for pattern multiplication. The pinning area may be one which is hydrophilic having a greater affinity for example to polar block copolymer segments such as the polymethyl methacrylate block segment in a block copolymer of styrene and methyl methacrylate or alternatively be a pinning area which may be hydrophobic having a greater affinity for example to the polystyrene block segments in a block copolymer of styrene and methyl methacrylate.

Directed self-assembly using PS-b-PMMA type of block copolymer requires a neutral underlayer for chemoepitaxy growth of line and space pattern which can work on a number of different types of substrates. Cross-linkable terpolymer such as P(S-r-VBCB-r-MMA) (i.e., poly(styrene-co-4-vinylbenzocyclobutene-co-methyl methacrylate), have been used as crosslinking neutral mat layer composition in DSA processes. This terpolymer works efficiently as a neutral layer on oxide and nitride substrates such as SiOx (silicon oxy nitride) and SiN (silicon nitrited), but as a result of its hydrophobicity, this terpolymer causes severe de-wetting defects on SiARC (Silicon antireflective coating) substrate, leading to defects in subsequent DSA processes. Therefore, there is a necessity to develop a new crosslinkable neutral mat material suitable specifically for SiARC substrate.

There is also a need to develop non-polar (a.k.a. hydrophobic) pinning mat layer for directed self-assembly using PS-b-PMMA type of block copolymer requires a robust PS pinning pattern for chemoepitaxy growth of line and space pattern. In general, cross-linkable PS copolymer such as P(S-r-VBCB)-H (i.e., poly(styrene-co-4-vinylbenzocyclobutene)) is a widely used hydrophobic crosslinking pinning mat composition in the LiNe flow (Liu-Nealey flow) DSA process. This copolymer works efficiently for oxide and nitride substrates such as SiOx and SiN. However, as a result of its hydrophobicity, this copolymer causes severe de-wetting defects on SiARC substrate, leading to defects in subsequent DSA processes. There is a necessity to develop a new crosslinkable hydrophobic mat material suitable specifically for SiARC substrate. A mat material is a crosslinked material which is insoluble to any layer coated on top of it, which can be used as a DSA neutral or pinning layer material.

DETAILED DESCRIPTION OF DRAWINGS

FIG. 1 Representative structure of tetra-copolymer which can form a neutral layer FIG. 2 Representative structure of a penta-copolymer which can form a neutral layer FIG. 3: $^1$H NMR spectrum of P(S-r-VBCB-r-MMA-r-VBA)-OH, a representative terpolymer which can form a neutral layer FIG. 4: $^1$H NMR spectrum of P(S-r-VBCB-r-MMA-r-VBA)-COOH, a representative tetra-copolymer which can form a neutral layer FIG. 5: $^1$NMR spectrum of P(S-r-VBCB-r-MMA-r-HEMA-r-VBA), a representative penta-copolymer which can form a neutral layer FIG. 6: Coating defect analyses of neutral mat on SiARC by LPC (FOV 100)

FIG. 7: Representative Example of terpolymer which can form non-polar crosslinked pinning MAT P(S-r-VBCB-r-VBA)-R where R=H, OH, COOH FIG. 8 $^1$NMR spectrum of P(S-r-VBCB-r-VBA)-COOH Example 14

FIG. 9 $^1$NMR spectrum of P(S-r-VBCB-r-VBA)-OH Example 15

FIG. 10 Coating defect analyses of hydrophobic mats on SiARC by LPC

FIG. 11 SP5 SEM images of various defects for Comparative Example 2

FIG. 12 SP5 SEM images of various defects for Example 15

FIG. 13 SP5 SEM images of various defects for Example 14

FIG. 14 IMEC Self-Assembly Defect Study Template key for Greytone defect designation in FIGS. 15 to 17

FIG. 15 IMEC Defect Study (SOL COMP 2),

FIG. 16 IMEC Defect Study DO1: (SOL 15)

FIG. 17 IMEC Defect Study DO1: (SOL 14)

FIG. 18 Examples of Coating defect types for Coatings in Table 6, f neutral layer films using P(S-r-VBCB-r-MMA-r-VBA)-OH films cast on ISX302 and ISX304.

FIG. 19 Examples of contact hole self-assembly of films Coatings of Neutral Layers in Table 6, using P(S-r-VBCB-r-MMA-r-VBA)-OH films cast on ISX302 and ISX304.

SUMMARY OF THE INVENTION

One aspect of this invention is an improved version of crosslinkable neutral tetrapolymers and pentapolymers which are compatible with SiARC as well as SiOx and SiN substates. One aspect of this are new tetrapolymers and pentapolymers consisting of styrene(S), 4-vinylbenzocyclobutene (VBCB), methyl methacrylate (MMA), 2-hydroxyethyl methacrylate (HEMA) and 4-vinylbenzoic acid (VBA) initiated by either 4,4'-azobis(4-cyanopentanol) (AIBN-OH) or 4,4'-Azobis(4-cyanovaleric acid) (AIBN-COOH). An improvement in the composition to P(S-r-VBCB-r-MMA-r-VBA-r-HEMA)-OH [i.e., hydroxyl-terminated poly(styrene-co-4-vinylbenzobcyclobutene-co-methyl methacrylate-co-4-vinylbenzoic acid-co-2-hydroxyethyl methacrylate)] or P(S-r-VBCB-r-MMA-r-VBA-r-HEMA)-COOH [i.e., carboxylic acid-terminated poly(styrene-co-4-vinylbenzobcyclobutene-co-methyl methacrylate-co-4-vinylbenzoic acid-co-2-hydroxyethyl methacrylate)] gave neutral crosslinking mats with low coating defects. The S and MMA components give the polymer the necessary neutrality. The VBCB component allows the polymer to crosslink into an insoluble film when baked. The VBA and HEMA components make the polymer more compatible with the SiARC substrate. The hydroxyl- or carboxylic acid-terminated end group from the initiator grafts the polymer onto the substrate and holds the polymer as the high temperature bake crosslinks the polymer.

Another aspect of this improved version of crosslinkable hydrophobic copolymer which is compatible with SiARC as well as SiOx and SiN substates. The new copolymer consists of styrene(S), 4-vinylbenzocyclobutene (VBCB), and 4-vinylbenzoic acid (VBA) initiated by either 4,4'-azobis(4-cyanopentanol) (AIBN-OH) or 4,4'-Azobis(4-cyanovaleric acid) (AIBN-COOH). An improvement in the composition to P(S-r-VBCB-r-VBA)-OH [i.e., hydroxyl-terminated poly (styrene-co-4-vinylbenzobcyclobutene-co-4-vinylbenzoic acid)] or P(S-r-VBCB-r-VBA)-COOH [i.e., carboxylic acid-terminated poly(styrene-co-4-vinylbenzobcyclobutene-co-4-vinylbenzoic acid)] gave hydrophobic crosslinking pinning mats with low coating defects. The S component gives the polymer the pinning hydrophobicity. The VBCB component allows the polymer to crosslink into an insoluble film when baked. The VBA component makes the polymer more compatible with the SiARC substrate. The hydroxyl- or carboxylic acid-terminated end group from the initiator grafts the polymer onto the substrate and holds the polymer as the high temperature bake crosslinks the polymer.

This invention describes a random copolymer of structure (A) comprising, a carboxylic acid bearing repeat unit of structure (I), wherein $R_{m1}$ is H or a C-1 to C-4 alkyl, and n1 is the total number of this repeat unit; wherein this repeat unit ranges from about 1.0 mole % to about 5.0 mole % in said copolymer;

a 4-vinylbenzocyclobutene derived repeat unit of structure (II), wherein $R_{m2}$ is H or a C-1 to C-4 alkyl, and n2 is the total number of this repeat unit; wherein this repeat unit ranges from about 5.0 mole % to about 35.0 mole % in said copolymer;

a styrenic repeat unit of structure (III), wherein $R_{m3}$ is H or a C-1 to C-4 alkyl, $R_{sty}$ is selected from H, a C-1 to C-8 alkyl, and a C-1 to C-4 alkyloxy and n3 is the total number of this repeat unit; wherein this repeat unit ranges from about 25 mole % to about 94.0 mole % in said copolymer;

an alkyl acrylate or alkyl 2-methylenealkanoate derived repeat unit of structure (IV), wherein $R_{m4}$ is H or a C-1 to C-4 alkyl, $R_I$ is a C-1 to C-8 alkyl and n4 is the total number of this repeat unit, wherein this repeat unit ranges from 0 mole % to about 64 mole % in said copolymer;

a hydroxy functionalized alkyl acrylate or alkyl 2-methylenealkanoate derived repeat unit of structure (V), wherein $R_{m5}$ is H or a C-1 to C-4 alkyl, $L_1$ is a C-2 to C-8 alkylene moiety and n5 is the total number of this repeat unit, wherein this repeat unit ranges from 0 mole % to about 3 mole % in said copolymer, and two end groups as shown in structure (A) one of which is H and the other is a methyl moiety substituted with Rr, $Rr_1$ and $Rr_2$, wherein $Rr_1$, is a C-1 to C-8 alkyl, $Rr_2$ is selected from a C-1 to C-8 alkyl, a C-1 to C-8 alkylene hydroxy moiety (-alkylene-OH), a C-1-C-8 alkylenecarboxylic acid moiety (-alkylene-$CO_2H$), or a benzylic alcohol comprising moiety of structure (B) wherein ni is an integer ranging from 0 to 5, nia is an integer from 1 to 5, nib is an integer from 1 to 5, and "*" designates the attached point of this moiety, Rr is a cyano moiety (—CN) or a carbonylalkyl moiety (—C(=O)—Ri), wherein Ri is a C-1 to C-8 alkyl or an aryl moiety; and further wherein the sum of the individual mole % of repeat units of structure (I), (II), (III), (IV) and (V), is either smaller than or equal to 100 mole % of the total repeat units present in said copolymer:

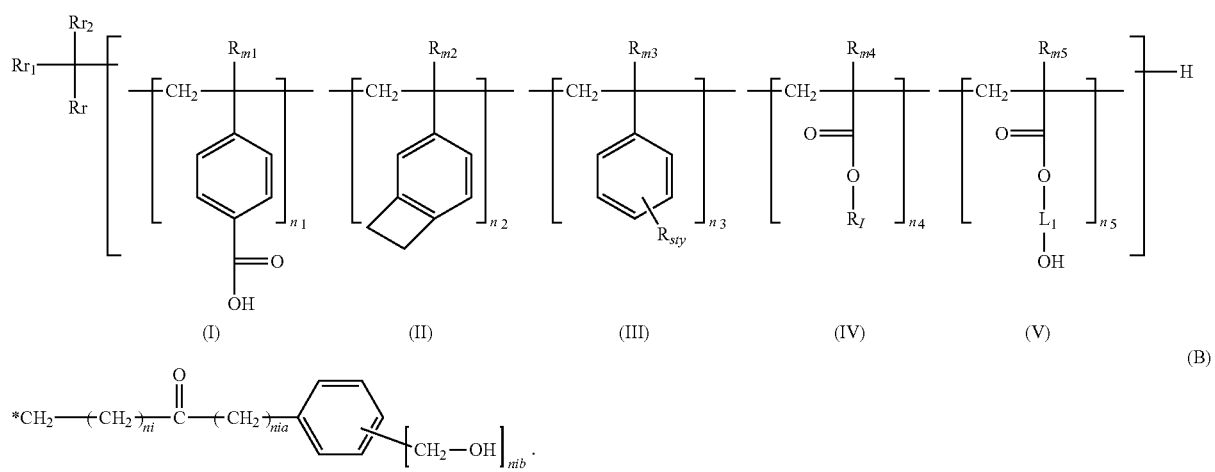

Another aspect of this invention are compositions which comprise one of these polymers and an organic spin coating solvent Another aspect of this invention is the process of coating these compositions and thermally producing either a crosslinked non-polar (a.k.a. hydrophobic) pinning mat or a crosslinked neutral layer and using these in lithographic DSA processing.

DETAILED DESCRIPTION OF THE INVENTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including," as well as other forms such as "includes" and "included", is not limiting. Also, terms such as "element" or "component" encompass both elements and components comprising one unit and elements or components that comprise more than one unit, unless specifically stated otherwise. As used herein, the conjunction "and" is intended to be inclusive and the conjunction "or" is not intended to be exclusive unless otherwise indicated. For example, the phrase "or, alternatively" is intended to be exclusive. As used herein, the term "and/or" refers to any combination of the foregoing elements including using a single element.

The term "C-1 to C-4 alkyl" embodies methyl and C-2 to C-4 linear alkyls and C-3 to C-4 branched alkyl moieties, for example as follows: methyl (—$CH_3$), ethyl (—$CH_2$—$CH_3$), n-propyl (—$CH_2$—$CH_2$—$CH_3$), isopropyl (—$CH(CH_3)_2$, n-butyl (—$CH_2$—$CH_2$—$CH_2$—$CH_3$), tert-butyl (—C($CH_3)_3$), isobutyl ($CH_2$—$CH(CH_3)_2$, 2-butyl (—$CH(CH_3)$ $CH_2$—$CH_3$). Similarly, the term C-1 to C-8 embodies methyl C-2 to C-8 linear, C-3 to C-8 branched alkyls, C-4 to C-8 cycloalkyls (e.g., cyclopentyl, cyclohexyl etc.) or C-5-C-8 alkylenecycloalkyls (e.g., —$CH_2$-cyclohexyl, $CH_2$—$CH_2$-cyclopentyl etc.).

The term "C-2 to C-5 alkylene" embodies C-2 to C-5 linear alkylene moieties (e.g. ethylene, propylene etc.) and C-3 to C-5 branched alkylene moieties (e.g., —$CH(CH_3)$—, —$CH(CH_3)$—$CH_2$—, etc.).

Di-block and triblock copolymers of styrenic and alkyl 2-methylenealkanoate derived repeat unit moieties useful as components in the inventive compositions described herein may be made by a variety of methods, such as anionic polymerization, atom transfer radical polymerization (ATRP), Reversible addition-fragmentation chain transfer (RAFT) polymerization, living radical polymerization and the like (Macromolecules 2019, 52, 2987-2994; Macromol. Rapid Commun. 2018, 39, 1800479; A. Deiter Shluter et al Synthesis of Polymers, 2014, Volume 1, p 315; Encyclopedia of Polymer Science and Technology, 2014, Vol 7, p 625.).

The random copolymer poly(styrene-co-methyl methacrylate) is abbreviated as "P(S-co-MMA)," and the oligomeric version of this materials is abbreviated oligo(S-co-MMA). Similarly, the block copolymer poly(styrene-block-methyl methacrylate) is abbreviated as P(S-b-MMA), while the oligomer of this material is abbreviated as oligo(S-b-MMA). The oligomer oligo(styrene-co-p-octylstyrene)-block-(methyl methacrylate-co-di(ethylene glycol) methyl ether methacrylate) uses the same abbreviations to designate random an block copolymer elements, specifically oligo(S-co-p-OS)-b-P(MMA-co-DEGMEMA), in which S=styrene, p-OS=para-octylstyrene, MMA=methyl methacrylate, DEGMEMA=di(ethylene glycol) methyl ether methacrylate designate the repeat units in this block copolymer whose two blocks are random copolymers.

FOV is the abbreviation for "field of view" for top-down scanning electron micrographs (SEM) for the SEM FIGS. in this application. "L/S" is an abbreviation for "line and space" lithographic features.

PGMEA and PGME are respectively abbreviations for 1-methoxypropan-2-yl acetate and 1-methoxypropan-2-ol.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature references and similar materials defines a term in a manner that contradicts the definition of that term in this application, this application controls.

Unless otherwise indicated, "alkyl" refers to hydrocarbon groups which can be linear, branched (e.g. methyl, ethyl, propyl, isopropyl, tert-butyl and the like) or cyclic (e.g. cyclohexyl, cyclopropyl, cyclopentyl and the like) multicyclic (e.g. norbornyl, adamantly and the like). These alkyl moieties may be substituted or unsubstituted as described below. The term "alkyl" refers to such moieties with C-1 to C-8 carbons. It is understood that for structural reasons linear alkyls start with C-1, while branched alkyls and cyclic alkyls start with C-3 and multicyclic alkyls start with C-5. Moreover, it is further understood that moieties derived from alkyls described below, such as alkyloxy and perfluoroalkyl, have the same carbon number ranges unless otherwise indicated. If the length of the alkyl group is specified as other than described above, the above-described definition of alkyl still stands with respect to it encompassing all types of alkyl moieties as described above and that the structural consideration with regards to minimum number of carbons for a given type of alkyl group still apply.

Alkyloxy (a.k.a. Alkoxy) refers to an alkyl group on which is attached through an oxy (—O—) moiety (e.g., methoxy, ethoxy, propoxy, butoxy, 1,2-isopropoxy, cyclopentyloxy cyclohexyloxy and the like). These alkyloxy moieties may be substituted or unsubstituted as described below.

Halo or halide refers to a halogen, F, Cl, Br or I which is linked by one bond to an organic moiety.

As used herein the term lactone encompasses both mono-lactones (e.g., caprolactone) and di-lactones (e.g., lactide).

Haloalkyl refers to a linear, cyclic or branched saturated alkyl group such as defined above in which at least one of the hydrogens has been replaced by a halide selected from the group of F, Cl, Br, I or mixture of these if more than one halo moiety is present. Fluoroalkyls are a specific subgroup of these moieties.

Perfluoroalkyl refers to a linear, cyclic or branched saturated alkyl group as defined above in which the hydrogens have all been replaced by fluorine (e.g., trifluoromethyl, perfluoroethyl, perfluoroisopropyl, perfluorocyclohexyl and the like).

Copolymer of Structure (A)

One embodiment of this invention is an inventive random copolymer of structure (A) comprising:

a carboxylic acid bearing repeat of structure (I), wherein $R_{m1}$ is H or a C-1 to C-4 alkyl, and n1 is the total number of this repeat unit; wherein this repeat unit ranges from about 1.0 mole % to about 5.0 mole % in said copolymer.

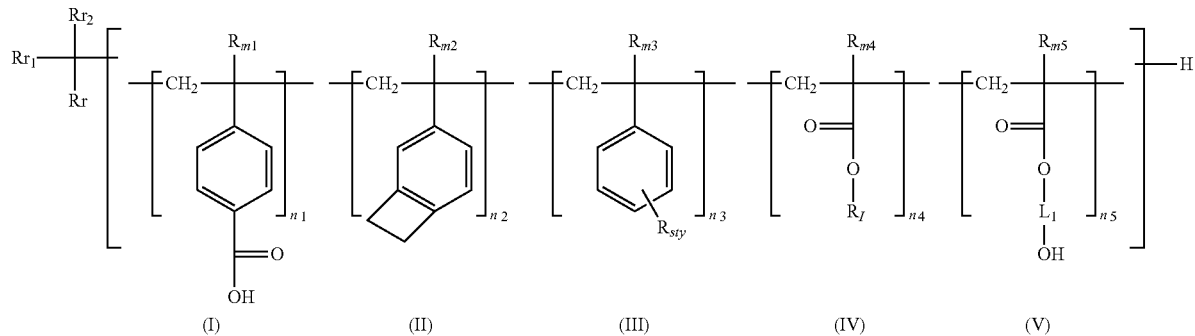

(A)

(I)  (II)  (III)  (IV)  (V)

(B)

a 4-vinylbenzocyclobutene derived repeat unit of structure (II), wherein $R_{m2}$ is H or a C-1 to C-4 alkyl, and n2 is the total number of this repeat unit; wherein this repeat unit ranges from about 5.0 mole % to about 35.0 mole % in said copolymer;

a styrenic repeat unit of structure (III), wherein $R_{m3}$ is H or a C-1 to C-4 alkyl, $R_{sty}$ is selected from H, a C-1 to C-8 alkyl, and a C-1 to C-4 alkyloxy and n3 is the total number of this repeat unit; wherein this repeat unit ranges from about 25 mole % to about 94.0 mole % in said copolymer;

an alkyl acrylate or alkyl 2-methylenealkanoate derived repeat unit of structure (IV), wherein $R_{m4}$ is H or a C-1 to C-4 alkyl, $R_I$ is a C-1 to C-8 alkyl and n4 is the total number of this repeat unit, wherein this repeat unit ranges from 0 mole % to about 64 mole % in said copolymer;

a hydroxy functionalized alkyl acrylate or alkyl 2-methylenealkanoate derived repeat unit of structure (V), wherein $R_{m5}$ is H or a C-1 to C-4 alkyl, $L_1$ is a C-2 to C-8 alkylene moiety and n5 is the total number of this repeat unit, wherein this repeat unit ranges from 0 mole % to about 3 mole % in said copolymer, and two end groups as shown in structure (A) one of which is H and the other is a methyl moiety substituted with Rr, $Rr_1$ and $Rr_2$, wherein $Rr_1$, is a C-1 to C-8 alkyl, $Rr_2$ is selected from a C-1 to C-8 alkyl, a C-1 to C-8 alkylene hydroxy moiety (-alkylene-OH), a C-1-C-8 alkylenecarboxylic acid moiety (-alkylene-CO$_2$H), or a benzylic alcohol comprising moiety of structure (B)

wherein ni is an integer ranging from 0 to 5, nia is an integer from 1 to 5, nib is an integer from 1 to 5, and "*" designates the attached point of this moiety, Rr is a cyano moiety (—CN) or a carbonylalkyl moiety (—C(=O)—Ri), wherein Ri is a C-1 to C-8 alkyl or an aryl moiety; and further wherein the sum of the individual mole % of repeat units of structure (I), (II), (III), (IV) and (V), is either smaller than or equal to 100 mole % of the total repeat units present in said copolymer:

In another aspect of this inventive random copolymer of structure (A), as described above, is one wherein said repeat unit of structure (III) ranges from about 30 mole % to about 60 mole % and the repeat unit of structure (IV) ranges from 0 mole % to about 45 mole %.

Copolymers Comprising Repeat Units (I), (II) and (III)

In one aspect of said inventive copolymer of structure (A), said repeat units consist essentially of the repeat units of structure (I), (II) and (III). In another aspect of this embodiment said copolymer is one whose repeat units consist of the repeat units of structure (I), (II) and (III).

In another aspect of said inventive copolymer of structure (A), described herein, said repeat unit of structure (I) ranges from about 1 mole % to about 5 mole %, said repeat unit of structure (II) ranges from about 5 mole % to about 9 mole %, said repeat unit of structure (III) ranges from about 90 mole % to about 94 mole %, and further where the sum of individual mole % for the repeat units of structures (I), (II) and (III) equals 100 mole % of the total repeat units in said copolymer.

In another aspect of said inventive copolymer of structure (A), described herein, $R_{m1}$, $R_{m2}$ and $R_{m3}$ are H.

In another aspect of said inventive copolymer of structure (A), $R_{sty}$ is H.

In another aspect of said inventive copolymer of structure (A), described herein, it has structure (A-1),

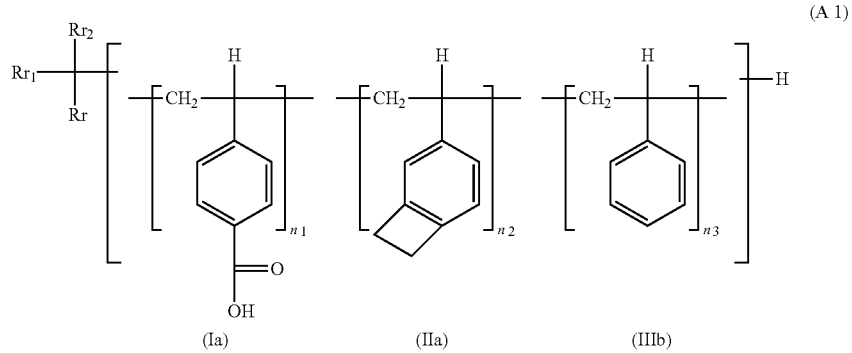

(A1)

(Ia)  (IIa)  (IIIb)

In another aspect of said inventive copolymer of structure (A), in said end group, which is a methyl moiety substituted with Rr, $Rr_1$ and $Rr_2$, $Rr_1$ is methyl. In another aspect $Rr_2$ is a C-1 to C-8 alkyl. In yet another aspect of $Rr_2$ is a C-1 to C-8 alkylene hydroxy moiety. In still another aspect, $Rr_2$ is a C-1 to C-8 alkylenecarboxylic acid moiety. In still another aspect, $Rr_2$ is a benzylic alcohol comprising moiety of structure (B), and in another aspect of this embodiment structure (B) has structure (B-1). In another aspect of this embodiment Rr is CN. In another aspect of this embodiment Rr is said carbonylalkyl moiety.

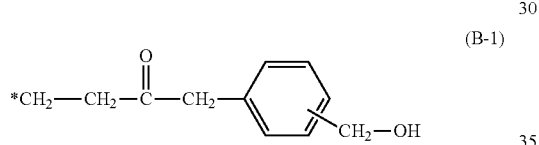

(B-1)

Copolymers Comprising Repeat Units (I), (II), (III) and (IV)

In one aspect of said inventive copolymer of structure (A) has structure (A-2), wherein, said repeat unit of structure (I) ranges from about 1 mole % to about 5 mole %,
said repeat unit of structure (II) ranges from about 15 mole % to about 35 mole %,
said repeat unit of structure (III) ranges from about 25 mole % to about 69 mole %, and
said repeat unit of structure (IV) ranges from about 5 mole % to about 49 mole %.

In another aspect of this embodiment, said inventive copolymer of structure (A-2), it is one wherein
said repeat unit of structure (I) ranges from about 1 mole % to about 5 mole %,
said repeat unit of structure (II) ranges from about 15 mole % to about 35 mole %,
said repeat unit of structure (III) ranges from about 30 mole % to about 60 mole %, and
said repeat unit of structure (IV) ranges from about 15 mole % to about 45 mole %.

In one aspect of the copolymer of structure (A-2), its repeat units consist essentially of the repeat units of structure (I), (II), (III) and (IV). In another aspect of this embodiment consist of the repeat units of structure (I), (II), (III) and (IV). In another aspect of this embodiment the sum of individual mole % for the repeat units of structures (I), (II), (III), and (IV) equals 100 mole % of the total repeat units in said copolymer.

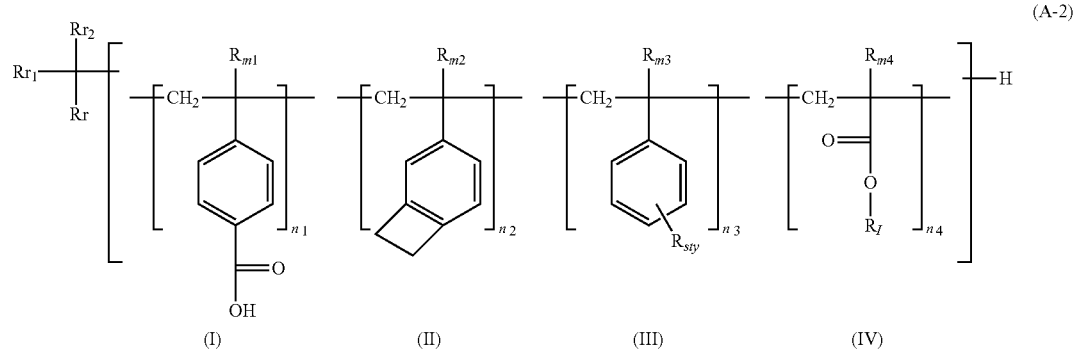

(A-2)

(I)  (II)  (III)  (IV)

In one aspect of said inventive copolymer of structure (A-2), $R_{m1}$, $R_{m2}$ and $R_{m3}$ are H and $R_{m4}$ is H. In another aspect, $R_{m1}$, $R_{m2}$ and $R_{m3}$ are H and $R_{m4}$ is methyl. In yet another aspect, $R_{sty}$ is H.

In one aspect of said inventive copolymer of structure (A-2) as described herein, it has structure (A-3).

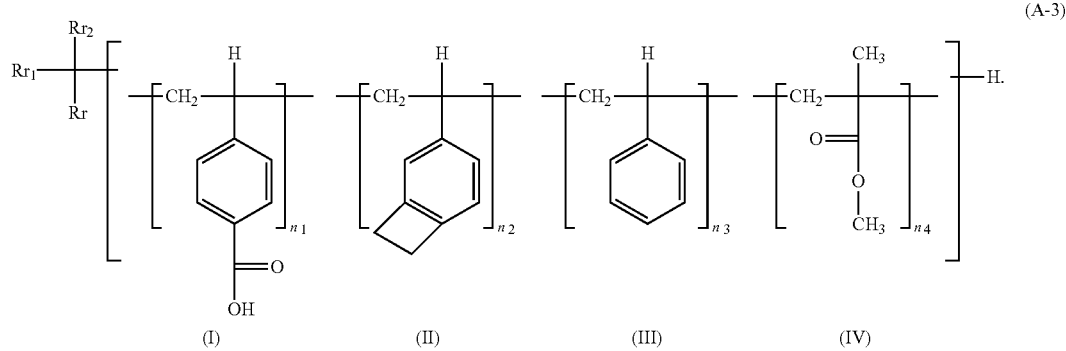

(A-3)

In another aspect of said inventive copolymer of structures (A-2) or (A-3), as described herein, in said end group, which is a methyl moiety substituted with Rr, $Rr_1$ and $Rr_2$, $Rr_1$ is methyl. In another aspect of this embodiment, $Rr_2$ is a C-1 to C-8 alkyl. In another aspect, $Rr_2$ is a C-1 to C-8 alkylene hydroxy moiety. In yet another aspect, $Rr_2$ is a C-1 to C-8 alkylenecarboxylic acid moiety. In still another aspect, $Rr_2$ is a benzylic alcohol comprising moiety of structure (B), and in another aspect of this embodiment it has structure (B-1). In another aspect of this embodiment Rr is CN. In another aspect, Rr is said carbonylalkyl moiety

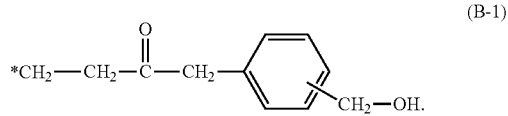

(B-1)

Copolymers Comprising Repeat Units (I), (II), (III), (IV) and (V)

In one aspect of said inventive copolymer of structure (A), said repeat unit of structure (I) ranges from about 1 mole % to about 5 mole %, said repeat unit of structure (II) ranges from about 15 mole % to about 35 mole %, said repeat unit of structure (III) ranges from about 30 mole % to about 60 mole %.

said repeat unit of structure (IV) ranges from about 15 mole % to about 45 mole %, said repeat unit of structure (V) ranges from about 1 mole % to about 3 mole %, In one aspect of this embodiment, its repeat units consist essentially of the repeat units of structure (I), (II), (III), (IV) and (V). In another aspect of this embodiment consists of the repeat units of structure (I), (II), (III). (IV) and (V). In another aspect of this embodiment the sum of individual mole % for the repeat units of structures (I), (II), (III), (IV), and (V) equals 100 mole % of the total repeat units in said copolymer. In another aspect of this embodiment, $R_{m1}$, $R_{m2}$, $R_{m3}$, $R_{m4}$ and $R_{m5}$ are H. In another aspect of this embodiment, $R_{m1}$, $R_{m2}$ and $R_{m3}$ are H and $R_{m4}$ and $R_{m5}$ are methyl. In another aspect of this embodiment, $R_{sty}$ is H.

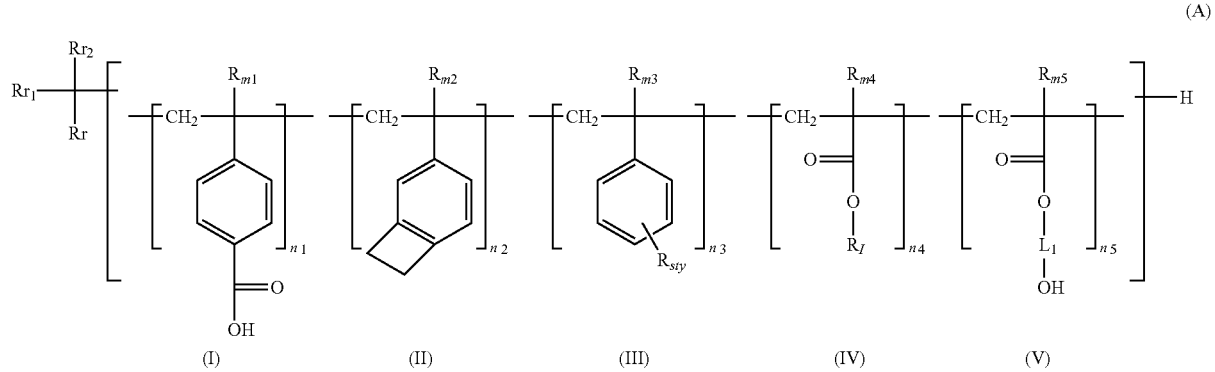

(A)

In another aspect of the embodiments described herein where repeat units of structures (I), (II), (III), (IV), and (V) are all present in one polymer as described herein, it has the more specific structure (A-

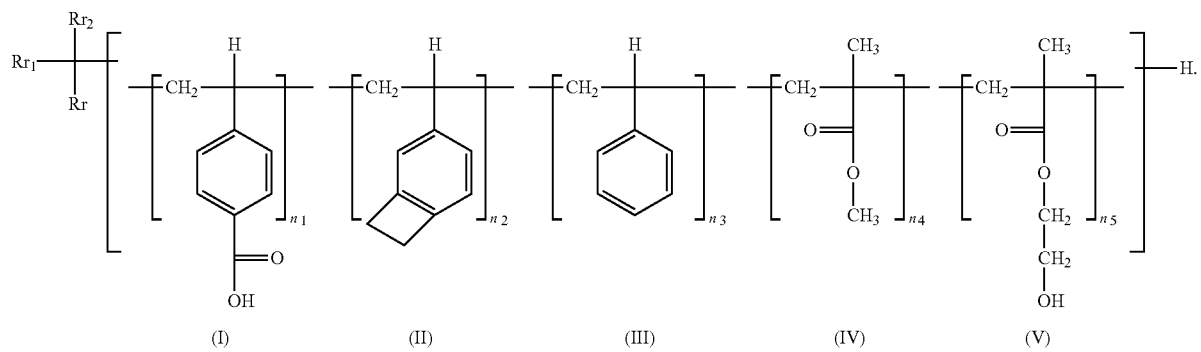

(A-4)

In another aspect of the embodiments described herein where repeat units of structures (I), (II), (III), (IV), and (V) are all present in one polymer and have either structures (A) or (A-4), in said end group, which is a methyl moiety substituted with Rr, $Rr_1$ and $Rr_2$; $Rr_1$ is methyl. In another aspect of this embodiment, $Rr_2$ is a C-1 to C-8 alkyl. In yet another aspect of this embodiment $Rr_2$ is a C-1 to C-8 alkylene hydroxy moiety. In still another aspect of this embodiment, $Rr_2$ is a C-1 to C-8 alkylenecarboxylic acid moiety. In still another aspect of this embodiment, $Rr_2$ is a benzylic alcohol comprising moiety of structure (B), and in another aspect of this embodiment it has structure (B-1). In yet another aspect Rr is CN. In yet another aspect, Rr is said carbonylalkyl moiety.

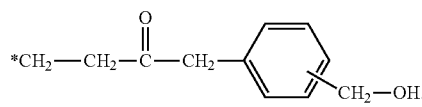

(B-1)

Composition Comprising Inventive Copolymers

Compositions Comprising any Copolymer of Structure (A)

Another aspect of this invention is a composition which can undergo crosslinking or a combination of crosslinking and grafting, comprising a copolymer of structure (A), as described herein, and an organic spin casting solvent.

Compositions Comprising the Copolymer of Structure (A), which Only Contain as Repeat Units, the Repeat Units of Structure (I), (II), (III), which can Either Undergo Crosslinking, or a Combination of Crosslinking and Grafting to Form a Non-Polar Pinning Layer Another aspect of this invention is a composition, which can undergo crosslinking or a combination of crosslinking and grafting, which comprises a copolymer and an organic spin casting solvent, wherein said copolymer is one which only contains the repeats units of structure (I), (II), and (III) or have the more specific structure (A-1), as described herein which can form a non-polar pinning layer, as described herein.

Compositions Comprising the Copolymer of Structure (A), which Only Contain as Repeat Units, the Repeat Units of Structure (I), (II), (III), which can Undergo a Combination of Crosslinking and Grafting to Form a Non-Polar Pinning Layer Another aspect of this invention is a composition, which can undergo a combination of crosslinking and grafting, which comprises a copolymer and an organic spin casting solvent, wherein said copolymer is one which only contains the repeats units of structure (I), (II), and (III) or have the more specific structure (A-1), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a, a benzylic alcohol comprising moiety of structure (B-1) which can form a non-polar pinning layer, as described herein.

Compositions Comprising the Copolymer of Structure (A), which Only Contain as Repeat Units, the Repeat Units of Structure (I), (II), (III), which can Only Undergo Crosslinking to Form a Non-Polar Pinning Layer Another aspect of this invention is a composition, which can undergo crosslinking, which comprises a copolymer and an organic spin casting solvent, wherein said copolymer is one which only contains the repeats units of structure (I), (II), and (III) or have the more specific structure (A-1), wherein $Rr_2$ is a C-1 to C-8 alkyl, which can form a non-polar pinning layer, as described herein.

Compositions Comprising the Copolymer of Structure (A), which Only Contain as Repeat Units, the Repeat Units of Structure (I), (II), (III), which can Either Undergo Crosslinking, or a Combination of Crosslinking and Grafting Another aspect of this invention is a composition, which can undergo crosslinking or a combination of crosslinking and grafting, which comprises a copolymer and an organic spin casting solvent, wherein said copolymer is one which only contains the repeats units of structure (I), (II), (III) and (IV) or have the more specific structures (A-2) or (A-3), which can form a non-polar pinning layer, as described herein.

Compositions Comprising the Copolymer of Structure (A), which Only Contain as Repeat Units, the Repeat Units of Structure (I), (II), (III) and (IV), which can Either Undergo Crosslinking or a Combination of Crosslinking and Grafting to Form a Neutral Layer Another aspect of this invention is a composition, which can undergo a combination of crosslinking and grafting, which comprises a copolymer and an organic spin casting solvent, wherein said copolymer only contains the repeats units of structure (I), (II), (III) and (IV) or have the more specific structures (A-2) or (A-3), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a benzylic alcohol comprising moiety of structure (B-1), as described herein.

Compositions Comprising the Copolymer of Structure (A), which Only Contain as Repeat Units, the Repeat Units of Structure (I), (II), (III) and (IV), which can Undergo a Combination of Crosslinking and Grafting to Form a Neutral Layer Another aspect of this invention is a composition, which can undergo crosslinking, comprising a copolymer and an organic spin casting solvent, wherein said copolymer is one which only contains the repeats units of structure (I), (II), (III) and (IV) or have the more specific structures (A-2) or (A-3), wherein $Rr_2$ is a C-1 to C-8 alkyl, which can form a neutral layer, as described herein.

Compositions Comprising the Copolymer of Structure (A), which Only Contain as Repeat Units, the Repeat Units of Structure (I), (II), (III) and (IV), which can Only Undergo Crosslinking to Form a Neutral Layer Another aspect of this invention is a composition which can undergo crosslinking or a combination of crosslinking and grafting, comprising a copolymer and an organic spin casting solvent, wherein said copolymer is one which contains the repeats units of structure (I), (II), (III), (IV) and (V), or has the more specific structure (A-4), which can form a neutral layer, as described herein.

Compositions Comprising the Copolymer of Structure (A), which Only Contain as Repeat Units, the Repeat Units of Structure (I), (II), (III), (IV), and (V) which can Either Undergo Crosslinking or a Combination of Crosslinking and Grafting to Form a Neutral Layer Another aspect of this invention is a composition which can either under undergo crosslinking or a combination of crosslinking and grafting, wherein said copolymer is one which contains the repeats units of structure (I), (II), (III), (IV) and (V) or has the more specific structure (A-4), which can form a neutral layer, as described herein.

Compositions Comprising the Copolymer of Structure (A), which Contain as Repeat Units, the Repeat Units of Structure (I), (II), (III), (IV), and (V) which can Undergo a Combination of Crosslinking and Grafting to Form a Neutral Layer Another aspect of this invention is a composition which can undergo a combination of crosslinking and grafting, wherein said copolymer is one which contains the repeats units of structure (I), (II), (III), (IV) and (V) or has the more specific structure (A-4), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a benzylic alcohol comprising moiety of structure (B-1), which can form a neutral layer, as described herein.

Compositions Comprising the Copolymer of Structure (A), which Contain as Repeat Units, the Repeat Units of Structure (I), (II), (III), (IV), and (V) which can Only Undergo Crosslinking to Form a Neutral Layer Another aspect of this invention is a composition which can undergo crosslinking, comprising a copolymer and an organic spin casting solvent, wherein said copolymer contains the repeats units of structure (I), (II), (III), (IV) and (V) or has the, more the more specific structure (A-4), wherein $Rr_2$ is a C-1 to C-8 alkyl, which can form a neutral layer, as described herein.

Processes Using the Compositions Comprising Inventive Copolymers

Another aspect of this invention is a process for forming a crosslinked or grafted and cross-linked coating of a copolymer on a substrate comprising the steps:
i) forming a coating on a substrate using any one of the compositions described herein which comprises any one of the inventive copolymer having structure (A) as described herein,
ii) heating the coating at a temperature from about 90° C. to about 180° C. to remove solvent. and to form a crosslinked or a grafted and crosslinked coating of the copolymer,
iii) heating the crosslinked or a grafted and crosslinked coating of step ii) from about 200° C. to about 250° C. to form a fully cross-linked or fully crosslinked and grafted copolymer coating.

Processes for Forming a Non Polar Pinning Layer

Another aspect of this invention is a process for forming a crosslinked or grafted and crosslinked non-polar pinning coating on a substrate comprising the steps:
ia) forming a coating on a substrate using any one of the compositions described herein which comprises any one of the inventive copolymer described herein, which only contain the repeat units of structure (I), (II) and (III), as described herein,
iia) heating the coating at a temperature from about 90° C. to about 180° C. to remove solvent and to form a crosslinked or a grafted and crosslinked coating,
iiia) heating the crosslinked or a grafted and crosslinked coating of step iia) at a temperature from about 200° C. to about 250° C. to form a fully cross-linked or fully crosslinked and grafted non-polar pinning coating.

Another aspect of this invention is a process for forming a grafted and crosslinked non-polar pinning coating on a substrate comprising the steps:
ib) forming a coating on a substrate using any one of the compositions described herein which comprises any one of the inventive copolymer described herein, which only contain the repeat units of structure (I), (II) and (III), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a benzylic alcohol comprising moiety of structure (B-1), as described herein, iib) heating the coating at a temperature from about 90° C. to about 180° C. to remove solvent and to form a crosslinked or a grafted and crosslinked coating, iiib) heating the crosslinked or a grafted and crosslinked coating of step iib) at a temperature from about 200° C. to about 250° C. to form a fully crosslinked and grafted non-polar pinning coating.

Another aspect of this invention is a process for forming a crosslinked non-polar pinning coating on a substrate comprising the steps:

ic) forming a coating on a substrate using any one of the compositions described herein which comprises any one of the inventive copolymer described herein, which only contain the repeat units of structure (I), (II) and (III), wherein $Rr_2$ is a C-1 to C-8 alkyl, as described herein, iic) heating the coating at a temperature from about 90° C. to about 180° C. to remove solvent and to form a crosslinked coating, iiic) heating the crosslinked coating of step iic) at a temperature from about 200° C. to about 250° C. to form a fully crosslinked non-polar pinning coating.

Processes for Forming a Neutral Layer with Copolymer Containing only Repeat Units of Structures (I), (II), (III) and (IV)

Another aspect of this invention is a process for forming a cross-linked or grafted and crosslinked neutral coating on a substrate comprising the steps:

id) forming a coating on a substrate using any one of the compositions described herein which comprises any one of the inventive copolymer described herein, which only contain the repeat units of structure (I), (II), (III), and (IV), as described herein, iid) heating the coating at a temperature from about 90° C. to about 180° C. to remove solvent and to form a crosslinked or a grafted and crosslinked coating, iiid) heating the crosslinked coating of step iid) at a temperature from about 200° C. to about 250° C. to form a fully crosslinked non-polar pinning coating.

Another aspect of this invention is a process for forming a grafted and crosslinked neutral coating on a substrate comprising the steps:

ie) forming a coating on a substrate using any one of the compositions described herein which comprises any one of the inventive copolymer described herein, which only contain the repeat units of structure (I), (II), (III), and (IV), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a benzylic alcohol comprising moiety of structure (B-1), as described herein, iie) heating the coating at a temperature from about 90° C. to about 180° C. to remove solvent and to form a grafted and crosslinked coating, iiie) heating the crosslinked coating of step iie) at a temperature from about 200° C. to about 250° C. to form a fully grafted and crosslinked neutral coating.

Another aspect of this invention is a process for forming a crosslinked neutral coating on a substrate comprising the steps:

if) forming a coating on a substrate using any one of the compositions described herein which comprises any one of the inventive copolymer described herein, which only contain the repeat units of structure (I), (II), (III), and (IV), wherein $Rr_2$ is a C-1 to C-8 alkyl, as described herein, iif) heating the coating at a temperature from about 90° C. to about 180° C. to remove solvent and to form a crosslinked or a grafted and crosslinked coating, iiif) heating the crosslinked or a grafted and crosslinked coating of step iif) at a temperature from about 200° C. to about 250° C. to form a fully crosslinked neutral coating.

Processes for Forming a Neutral Layer with Copolymer Containing Only Repeat Units of Structures (I), (II), (III), (10 and (V)

Another aspect of this invention is a process for forming a crosslinked or a grafted and crosslinked neutral coating on a substrate comprising the steps:

ig) forming a coating on a substrate using any one of the compositions described herein which comprises any one of the inventive copolymer described herein, which only contain the repeat units of structure (I), (II), (III), (IV), and (V) as described herein, iig) heating the coating at a temperature from about 90° C. to about 180° C. to remove solvent and to form a crosslinked or a grafted and crosslinked coating, iiig) heating a crosslinked or a grafted and crosslinked coating of step iig) at a temperature from about 200° C. to about 250° C. to form a fully cross-linked or fully grafted and crosslinked neutral coating.

Another aspect of this invention is a process for forming a crosslinked and grafted neutral coating on a substrate comprising the steps:

ih) forming a coating on a substrate using any one of the compositions described herein which comprises any one of the inventive copolymer described herein, which only contain the repeat units of structure (I), (II), (III), (IV), and (V), wherein $Rr_2$ is selected from the group consisting of a C-1 to C-8 alkylene hydroxy moiety a C-1-C-8 alkylenecarboxylic acid moiety, a benzylic alcohol comprising moiety of structure (B), and a benzylic alcohol comprising moiety of structure (B-1), as described herein, iih) heating the coating at a temperature from about 90° C. to about 180° C. to remove solvent and to form a grafted and crosslinked coating, iiih) heating the grafted and crosslinked coating of step iih) at a temperature from about 200° C. to about 250° C. to form a fully grafted and crosslinked neutral coating.

Another aspect of this invention is a process for forming a crosslinked neutral coating on a substrate comprising the steps:

i') forming a coating on a substrate using any one of the compositions described herein which comprises any one of the inventive copolymer described herein, which only contain the repeat units of structure (I), (II), (III), (IV), and (V), wherein Rr 2 is a C-1 to C-8 alkyl, as described herein.

ii') heating the coating at a temperature from about 90° C. to about 180° C. to remove solvent and to form a crosslinked coating, iii') heating the crosslinked coating of step ii') at a temperature from about 200° C. to about 250° C. to form a fully crosslinked neutral coating.

Process for Self-Assembly of a Block Copolymer Using Inventive Neutral Layers

Another aspect of this invention is a process for forming a self-assembled block copolymer coating on a neutral coating comprising the steps:
- ij) forming neutral coating according to any of the inventive processes described herein which form a neutral layer coating,
- iij) applying a block copolymer over the neutral coating and annealing until directed self-assembly of the block copolymer coating occurs.

Processes for Graphoepitaxy Directed Self-Assembly Using Inventive Neutral Layer Another aspect of this invention is a process of graphoepitaxy, directed self-assembly of a block copolymer coating used to form an image comprising the steps:
- ik) forming neutral coating neutral coating according to any of the inventive processes described herein which form a neutral layer coating,
- iik) providing a coating of a photoresist coating over the neutral coating, and forming a pattern in the photoresist coating,
- iiik) applying a block copolymer comprising an etch resistant block and a highly etchable block over the photoresist pattern and annealing until directed self-assembly occurs; and,
- ivk) etching the block copolymer, thereby removing the highly etchable block of the copolymer overcoating areas of the substrate and simultaneously forming a pattern in the substrate selectively in these areas.

Another aspect of this process is one where the pattern in the photoresist coating is formed by imaging lithography selected from a group consisting of e-beam lithography, broadband UV lithography, 193 nm immersion lithography, 13.5 nm EUV lithography, 193 nm deep UV lithography, 248 nm deep UV lithography, 365 nm UV lithography and 436 nm UV lithography.

Processes for Chemoepitaxy Directed Self-Assembly Using Inventive Neutral Layers Another aspect of this invention is a process of chemoepitaxy, directed self-assembly of a block copolymer coating used to form an image comprising the steps:
- il) forming neutral coating on as substrate according coating according to any of the inventive processes described herein which form a neutral layer coating,
- iil) providing a coating of a photoresist coating over the neutral coating, and forming a pattern in the photoresist coating, thereby forming regions in which the neutral coating is uncovered by the resist,
- iiil) treating the uncovered neutral coating to remove it, forming a pinning area,
- ivl) removing the photoresist, uncovering the unaffected neutral coating forming a chemoepitaxy pattern containing neutral and pinning areas,
- vl) applying a block copolymer comprising an etch resistant block and a highly etchable block over the neutral coating and annealing until directed self-assembly occurs; and,
- vil) etching the block copolymer, thereby removing the highly etchable block of the copolymer overcoating areas of the substrate and simultaneously forming a pattern in the substrate selectively in these areas.

Another aspect of this process is one where the pattern in the photoresist coating is formed by imaging lithography selected from a group consisting of e-beam lithography, broadband UV lithography, 193 nm immersion lithography, 13.5 nm EUV lithography, 193 nm deep UV lithography, 248 nm deep UV lithography, 365 nm UV lithography and 436 nm UV lithography.

Processes for Chemoepitaxy Directed Self-Assembly Using Inventive Non-Polar Pinning Layers Another aspect of this invention is a process of chemoepitaxy, directed self-assembly of a block copolymer coating used to form an image comprised of the steps:
- im) forming a non-polar pinning coating on a substrate according to any one of the inventive processes, as described herein which form a non-polar pinning coating,
- iim) providing a coating of a photoresist coating over pinning coating,
- iiim) forming a pattern in the photoresist coating, thereby forming regions in which the pinning coating is uncovered by the resist,
- ivm) treating the uncovered pinning coating to remove it, forming bare substrate areas,
- vm) removing the photoresist, uncovering both the unaffected pinning coating and the bare areas of substrate,
- vim) applying a neutral coating in the areas of bare substrate forming a chemoepitaxy pattern containing neutral and pinning areas,
- viim) applying a block copolymer comprising an etch resistant block and a highly etchable block over the chemoepitaxy pattern and annealing until directed self-assembly occurs; and,
- viiim) etching the block copolymer, thereby removing the highly etchable block of the copolymer overcoating areas of the substrate and simultaneously forming a pattern in the substrate selectively in these areas.

Another aspect of this process is one where the pattern in the photoresist coating is formed by imaging lithography selected from a group consisting of e-beam lithography, broadband UV lithography, 193 nm immersion lithography, 13.5 nm EUV lithography, 193 nm deep UV lithography, 248 nm deep UV lithography, 365 nm UV lithography and 436 nm UV lithography.

Another aspect of this invention is a microelectronic device made using the patten formed in in any one of the self-assembly, graphoepitaxy directed self-assembly and chemoepitaxy processes.

Yet another aspect of this invention is the use of the composition as disclosed or claimed herein in the preparation of a coated substrate or an electronic device.

EXAMPLES

Chemicals and Characterization Equipment

Chemicals, unless otherwise indicated, were obtained from the Millipore-Sigma Corporation (St. Louis, Missouri).

$^1$H NMR spectra were recorded using Bruker Advance III 400 MHz spectrometer.

Lithographic Experiments were done using a TEL Clean ACT8 track. SEM pictures were taken with an Applied Materials NanoSEM_3D Scanning electron microscope picture are shown at either 5 FOV magnification or 100 FOV magnification (Field of view (FOV)=5 µm using 1, 2, and 5 FOV).

Etching experiments were done using standard isotropic oxygen etching conditions for self-assembled films block copolymer of methyl methacrylate and styrene.

Unless otherwise indicated Molecular weight measurements (a.k.a. $M_n$ polydispersity) were done by Gel permeation chromatography (PSS Inc. Germany) equipped with 100 Å, 500 Å, $10^3$ Å, $10^5$ Å and $10^6$ Å µ-ultrastyragel columns using THF solvent as an eluent. Polystyrene polymer standards were used for calibration. GPC was measured using Agilent Gel permeation chromatography systems equipped with 100 Å, 500 Å, $10^3$ Å, $10^5$ Å and $10^6$ Å µ-ultrastyragel columns showed that the $1^{st}$ P(SDPE) block had $M_n$(GPC)=45,048 g/mol and $M_w/M_n$=1.04 with respect to PS calibration standards. Gel Permeation Chromatography: 1 mg/mL in THF solution injected using 0.1 µL into a polystyrene-calibrated GPC tool with 1 mL/min THF flow.

Synthesis of Polymeric Materials for Testing

Reference Block Copolymer Synthesis Example 1
Synthesis of P(S-b-MMA) (26k-b-30k)

P(S-b-MMA) (26K-b-30K) was synthesized using the same procedure as described in example 2. To achieve target $M_n$ and compositions of PS and PMMA block, the amount of initiator and monomer quantities were changed. Briefly, 20 g (192 mmol) of styrene was polymerized with 0.55 mL (1.4M solution) of sec-butyllithium. Then 0.16 g (0.7 mmol) of 1,1'-diphenylethylene (DPE) in 2.5 ml of dry toluene was added via ampule into the reactor. The orange color of the reaction mixture turned into dark brick-red indicating conversion of styryllithium active centers to delocalized DPE adduct carbanion. After 2 min of stirring, a small amount (2 mL) of the reaction mixture was withdrawn for PS block molecular weight analysis. Then methyl methacrylate (22.85 g, 230 mmol) was added via ampule. The reaction was terminated after 30 min with 1 mL of degassed methanol. The block copolymer was recovered by precipitation in excess isopropanol (5 times of the polymer solution) containing 10% water, filtered, and dried at 55° C. for 12 h under vacuum giving 40 g of P(S-b-MMA) (94% yield) consisting of 46.9 mol. % of polystyrene block and 53.1 mol. % of polymethylmethacrylate block. The diblock copolymer molecular weight obtained from GPC is $M_{n,PS-b-PMMA}$=46, 978 g/mol and $M_w/M_n$=1.02.

Reference Block Copolymer Solution (Ref SOL 1)

Reference Block Copolymer Synthesis Examples 1 was dissolved into in PGMEA as a 1.7 wt. % solutions and filtered these through a 0.2-micron PTFE filter. This solution was used for the Neutrality Experiments done to Evaluate both the Inventive Neutral Layers and Inventive non-polar pinning layers described as follows:

Inventive Neutral Layers Testing for L/S and Contact Hole Self-Assembly

Summary of Examples and Testing of Inventive Neutral Layers

Herein are disclosed crosslinkable neutral tetrapolymers and pentapolymers which were found to be compatible with SiARC as well as SiOx and SiN substates. These new tetrapolymers and pentapolymers consisting of styrene(S), 4-vinylbenzocyclobutene (VBCB), methyl methacrylate (MMA), 2-hydroxyethyl methacrylate (HEMA) and 4-vinylbenzoic acid (VBA) initiated by either 2,2'-Azobis(2-methylpropionitrile) (AIBN), 4,4'-azobis(4-cyanopentanol) (AIBN-OH) or 4,4'-Azobis(4-cyanovaleric acid) (AIBN-COOH) were made to address this issue. Also made was the polymer P(S-r-VBCB-r-MMA-r-VBA-r-HEMA) [i.e., poly (styrene-co-4-vinylbenzobcyclobutene-co-methyl meth-acrylate-co-4-vinylbenzoic acid-co-2-hydroxyethyl methacrylate)], P(S-r-VBCB-r-MMA-r-VBA)-OH [i.e., hydroxyl-terminated poly(styrene-co-4-vinylbenzobcyclobutene-co-methyl methacrylate-co-4-vinylbenzoic acid)] or P(S-r-VBCB-r-MMA-r-VBA)-COOH [i.e., carboxylic acid-terminated poly(styrene-co-4-vinylbenzobcyclobutene-co-methyl methacrylate-co-4-vinylbenzoic acid)] which gave when coated and crosslinked a crosslinking neutral mat with low coating defects. Depending on the block copolymer (BCP) employed these neutral layers were shown to be able to affect either self-assembly to produce a L/S self-assembled fingerprint pattern (a.k.a. with BCP ref SOL 1) or to produce a contact hole self-assembled pattern (e.g. with ref SOL 2), where these neutral layers showed good compatibility for different SiARC substrate, and also affected the aforementioned self-assembly with few if any defects compared to reference materials.

In these materials the S component gives the polymer the needed hydrophobicity, the VBCB hydrophobic component allowed the polymer to crosslink into an insoluble film when baked, the MMA component gave the polymers the needed hydrophilicity for neutrality and unexpectedly the inclusion of VBA (1 to 5 wt %) gave good compatibility to SiARC. Incorporation of VBA at higher amounts at the expense of PMMA—was shown to negatively affect neutrality, however, a combination of VBA and HEMA components was found to be effective in making the polymer more hydrophilic and compatible with the SiARC substrate. When present, the hydroxyl or carboxylic acid terminated end group from the radical initiator assisted the polymer chain to graft onto the substrate as the VBCB crosslinks upon heating.

The analysis of the crosslinked film was first checked for film retention with a soak test and neutrality with a fingerprint test. A novel tetra- or pentapolymeric solution was spin coated and baked on a wafer. This newly formed film was soaked in EBR solvent (70/30 PGME/PGMEA) and then rinsed off. Measurement of the film thickness before and after the soak test determined the film retention. A solution of a diblock copolymer of styrene and methyl methacrylate ref SOL 1 (Block Copolymer Example 1) was coated on these test films and was annealed on the novel tetra- or pentapolymeric film to study the neutrality for the appearance of fingerprint. This impartiality for either block of the diblock copolymer allows for the self-assembly of the BCP into lines. The coating was then analyzed for defects using SEM method (VM277), which showed improved coating with insignificant defects.

FIG. 1 shows a non-limiting representative structure for the inventive tetrapolymeric material, P(S-r-VBCB-r-MMA-r-VBA)-X where X=HO, COOH. FIG. 2, shows a non-limiting representative for the pentapolymeric materialP (S-r-VBCB-r-MMA-r-VBA-r-HEMA). These type of materials such as P(S-r-VBCB-r-MMA-r-HEMA-r-VBA), P(S-r-VBCB-r-MMA-VBA)-OH and P(S-r-VBCB-r-MMA-r-VBA)-COOH incorporates additional hydrophilic functionalities which are not commonly used in neutral crosslinking mats compositions. Unexpectedly, the incorporation of these hydrophilic groups improved the compatibility of polymer film on SiARC substrates and when crosslinked lead to a very large decrease in the number of de-wetting defects in the resultant crosslinked neutral layer. All these inventive compositions showed fewer defects as crosslinked neutral layers on SiARC than crosslinked neutral layers formed from than a reference neutral layer formed from a terpolymer P(S-r-VBCB-MMA) which does not contain VBA.

Also, combinations of 4-vinylbenzoic acid (VBA) and 2-hydroxyethyl methacrylate (HEMA) were also found to be useful for these novel compositions by decreasing the de-wetting defects of the hydrophobic film on SiARC compared to neutral layers formed from the reference terpolymer P(S-r-VBCB-MMA). Because SiARCs are commonly used in the architecture of microchips, in observed increase in compatibility of the crosslinked films formed from the inventive materials fulfills a need. Unexpectedly, the polar functionalities of VBA and HEMA improved the adhesion of the hydrophobic film on any surface, thus reducing de-wetting defects.

Additionally, derivatives of P P(S-r-VBCB-r-MMA-r-VBA)-were made using functionalized radical initiators such as AIBN-OH or AIBN-COOH in terpolymer compositions with 4-vinylbenzoic acid (VBA) which gave neutral layers after thermal treatment which were both crosslinked and grafted and these neutral layers showed very little defects. The end-group functionalization of these polymers allowed for a grafting reaction on the substrate which pinned these terpolymers to the SiARC while simultaneously cross-linking the bake temperatures.

It was found that the optimal loading of VBA in these copolymers was 1-3 mole % which neutrality in these compositions. As the incorporation of VBA increase towards 5 mole % a loss of neutrality started to occur. However, counterbalancing this increased amount of VBA also reduced the overall number of defects (e.g., see SOL 8 and SOL 9 in Table 2).

The combination of hydroxyl and carboxyl functionalities generally gave better defects counts than a single functionality. As seen in comparison of SOL 2 and SOL3, the combination of hydroxyl end group and VBA gave better defects than carboxylic acid end group and VBA (Table 2).

It was observed (Table 2) that as the amount of VBCB decreased the number of overall defects also decreases. Higher amounts of VBCB, once crosslinked, reduces the flexibility of the film; thus, causing more rigidity. Although not bound by theory it is believed that this phenomenon increased defects levels upon baking as the crosslinked network became denser. Counter balancing this, reducing the amount of VBCB may also lead to a loss of neutrality.

These inventive copolymers containing VBA for us as low defect forming neutral underlayer were reproducibly produced with controllable synthetic methods using free-radical polymerization conditions.

In summary of the advantages of these novel materials, the neutral crosslinked MATs produced from these materials when used for DSA processing gave much better compatibility on SiARC substrates with fewer defects. The moderate contact angles and low film loss characterize observed in neutral layer produced from these novel polymers were ideal for DSA processing. As a result of these moderate contact angles, coating with photoresist and photolithographic processing gave better desired pattern needed for the DSA process. The neutral layers films produced from coating and crosslinking on SiARC produced films with a much-decreased level of particles and de-wetting defects on this neutral mat which will lead to an improved DSA process by reducing defects overall. Finally, the compatibility of the neutral layers formed from the inventive polymers on SiARC allows for muti-layer application via spin-on process (2D stacking).

Example 1

Synthesis of Poly(styrene-co-4-vinylbenzocyclobutene-co-methyl methacrylate-co-4-vinylbenzoic acid)-hydroxyl Terminated Styrene (12.2 g, 120 mmol), 4-vinylbenzocyclobutene (13.9 g, 110 mmol), methyl methacrylate (12.5 g, 120 mmol), 4-vinylbenzoic acid (1.05 g, 7.1 mmol), 4,4'-azobis (4-cyanopentanol) (0.40 g, 1.57 mmol) and 2-butanone (60 g) were added into a flask and sparged with nitrogen for 30 minutes. The mixture was heated in a 90° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 18.0 g (65.3%) white powder, GPC: 14,446 g/mol Mn, 24,748 g/mole Mw, 1.71 PDI.

Example 2

Synthesis of Poly(styrene-co-4-vinylbenzocyclobutene-co-methyl methacrylate-co-4-vinylbenzoic acid)-hydroxyl Terminated Styrene (12.2 g, 120 mole), 4-vinylbenzocyclobutene (13.9 g, 110 mmol), methyl methacrylate (12.5 g, 120 mmol), 4-vinylbenzoic acid (1.05 g, 7.1 mmol), 4,4'-azobis (4-cyanopentanol) (0.40 g, 1.57 mmol) and 2-butanone (60 g) were added into a flask and sparged with nitrogen for 30 minutes. The mixture was heated in a 90° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 18.2 g (66.1%) white powder, GPC: 13,391 g/mol Mn, 24,461 g/mole Mw, 1.83 PDI.

Example 3

Synthesis of Poly(styrene-co-4-vinylbenzocyclobutene-co-methyl methacrylate-co-4-vinylbenzoic acid)-carboxylic Acid Terminated Styrene (12.2 g, 120 mole), 4-vinylbenzocyclobutene (13.9 g, 110 mmol), methyl methacrylate (12.5 g, 120 mmol), 4-vinylbenzoic acid (1.05 g, 7.1 mmol), 4,4'-azobis (4-cyanovaleric acid) (0.40 g, 1.41 mmol) and 2-butanone (60 g) were added into a flask and sparged with nitrogen for 30 minutes. The mixture was heated in a 90° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 18.1 g (65.7%) white powder, GPC: 12,831 g/mol Mn, 23,805 g/mole Mw, 1.86 PDI.

Example 4

Synthesis of Poly(styrene-co-4-vinylbenzocyclobutene-co-methyl methacrylate-co-4-vinylbenzoic acid-co-2-hydroxyethyl methacrylate)

Styrene (15.62 g, 150 mmol), 4-vinylbenzocyclobutene (19.53 g, 180 mmol), methyl methacrylate (18.02 g, 180 mmol), 4-vinylbenzoic acid (2.22 g, 15 mmol), 2-hydroxyethyl methacrylate (0.65 g, 5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 37.7 g (67.0%) white powder, GPC: 29,448 g/mol Mn, 48,053 g/mole Mw, 1.63 PDI.

Example 5

Synthesis of Poly(styrene-co-4-vinylbenzocyclobutene-co-methyl methacrylate-co-4-vinylbenzoic acid-co-2-hydroxyethyl methacrylate)

Styrene (13.02 g, 125 mmol), 4-vinylbenzocyclobutene (19.53 g, 150 mmol), methyl methacrylate (20.53 g, 205 mmol), 4-vinylbenzoic acid (2.22 g, 15 mmol), 2-hydroxyethyl methacrylate (0.65 g, 5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 38.0 g (67.7%) white powder, GPC: 28,750 g/mol Mn, 46,102 g/mole Mw, 1.60 PDI.

Example 6

Synthesis of Poly(styrene-co-4-vinylbenzocyclobutene-co-methyl methacrylate-co-4-vinylbenzoic acid-co-2-hydroxyethyl methacrylate)

Styrene (20.83 g, 200 mmol), 4-vinylbenzocyclobutene (13.02 g, 100 mmol), methyl methacrylate (18.02 g, 180 mmol), 4-vinylbenzoic acid (2.22 g, 15 mmol), 2-hydroxyethyl methacrylate (0.65 g, 5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 36.9 g (67.2%) white powder, GPC: 46,809 g/mol Mn, 66,245 g/mole Mw, 1.41 PDI.

Example 7

Synthesis of Poly(styrene-co-4-vinylbenzocyclobutene-co-methyl methacrylate-co-4-vinylbenzoic acid-co-2-hydroxyethyl methacrylate)

Styrene (21.35 g, 205 mmol), 4-vinylbenzocyclobutene (11.72 g, 90 mmol), methyl methacrylate (18.72 g, 187 mmol), 4-vinylbenzoic acid (2.00 g, 14 mmol), 2-hydroxyethyl methacrylate (0.59 g, 4.5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 38.4 g (70.4%) white powder, GPC: 46,699 g/mol Mn, 66,453 g/mole Mw, 1.42 PDI.

Example 8

Synthesis of Poly(styrene-co-4-vinylbenzocyclobutene-co-methyl methacrylate-co-methyl methacrylate-co-4-vinylbenzoic acid-co-2-hydroxyethyl methacrylate)

Styrene (20.83 g, 200 mmol), 4-vinylbenzocyclobutene (9.77 g, 75 mmol), methyl methacrylate (19.52 g, 195 mmol), 4-vinylbenzoic acid (3.70 g, 25 mmol), 2-hydroxyethyl methacrylate (0.65 g, 5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 37.9 g (69.3%) white powder, GPC: 28,313 g/mol Mn, 47,107 g/mole Mw, 1.66 PDI.

Example 9

Synthesis of Poly(styrene-co-4-vinylbenzocyclobutene-co-methyl methacrylate-co-methyl methacrylate-co-4-vinylbenzoic acid-co-2-hydroxyethyl methacrylate)

Styrene (26.04 g, 250 mmol), 4-vinylbenzocyclobutene (9.76 g, 75 mmol), methyl methacrylate (14.52 g, 145 mmol), 4-vinylbenzoic acid (3.70 g, 25 mmol), 2-hydroxyethyl methacrylate (0.65 g, 5 mmol), 4,4'-azobis(2-methylpropionitrile) (0.41 g, 2.5 mmol) and anisole (100 g) were added into a flask and degassed by freeze-thaw three times. The mixture was heated in a 90° C. oil bath for 16 hours. The mixture was cooled to room temperature and diluted twofold with THF before precipitating in isopropanol. The polymer was collected and redissolved in THF as a 15% solids solution and precipitated in isopropanol. The polymer was collected and dried in a vacuum over at 70° C. 37.6 g (68.5%) white powder, GPC: 32,692 g/mol Mn, 51,032 g/mole Mw, 1.56 PDI.

Comparative Example 1

Synthesis of Poly(styrene-co-4-vinylbenzocyclobutene-co-methyl methacrylate) benzyl alcohol Terminated The synthesis of the Azo initiator was described in U.S. Pat. No. 9,574,104B1 and was used in this polymerization. In a 2 L 4-neck round bottomed flask equipped with a stir bar, a reflux condenser, a temperature controller and a nitrogen sparging tube, styrene (143.8 g, 1.38 mole), methyl methacrylate (184.9 g, 1.84 mole), 4-vinylbenzocyclobutene (180.0 g, 1.38 mole), and 2-butanone (620 g) were added. The reaction mixture was stirred while nitrogen was sparged in for 20 min. The mixture was heated in a heating mantle with the temperature controller set to 80° C. At 80° C., a solution of Azo-initiator (3.05 g, 5.07 mmol) in 2-butanone (12.2 g) over 1 minute. The mixture was heated at 80° C. for 20 hours. An additional solution of Azo-initiator (1.22 g) in 2-butanone (4.88 g) was added over 1 minute. The mixture continued heating at 80° C. for 24 hours. The mixture was cooled, diluted with 2-butanone (900 g), then slowly precipitated in IPA (15 L). The precipitate was collected by vacuum filtration and oven dried. The residue was re-dissolved in THF (15% solids) and precipitated in MeOH (15 L) once again. The precipitate was collected by vacuum filtration and oven dried. The solid was redissolved in 2-butanone (1900 g), filtered through a 0.2 µm nylon filter and slowly precipitated into IPA (15 L). The precipitate was collected by vacuum filtration and oven dried. The polymer is an off-white solid, 290 g (57.0%). GPC: 38,842 g/mol Mn, 90,053 g/mol Mw, 2.30 PDI.

FIGS. 3, 4 and 5, respectively, show representative NMR spectra of P(S-r-VBCB-r-MMA-r-VBA)-OH (Examples 1 and 2), P(S-r-VBCB-r-MMA-r-VBA)-COOH (Example 3) and P(S-r-VBCB-r-MMA-r-HEMA-r-VBA) (Examples 4 to 9).

Table 1 gives a summary of the characterization data for both the Inventive polymers 1 to 9 and for Comparative Example 1.

TABLE 1

Summary of polymer characterization of P(S-r-VBCB-r-MMA-r-VBA)-X and P(S-r-VBCB-r-MMA-r-VBA-r-HEMA)

| Sample | S | VBCB | MMA | VBA | HEMA | Initiator | Mw | PDI |
|---|---|---|---|---|---|---|---|---|
| Comp Ex. 1 | 30 | 30 | 40 | 0 | 0 | Azo-OH | 90k | 2.30 |
| Ex. 1 | 34 | 30 | 35 | 1 | 0 | AIBN-OH | 25k | 1.71 |
| Ex. 2 | 33 | 30 | 35 | 2 | 0 | AIBN-OH | 24k | 1.83 |
| Ex. 3 | 33 | 30 | 35 | 2 | 0 | AIBN-COOH | 24k | 1.86 |
| Ex. 4 | 30 | 30 | 36 | 3 | 1 | AIBN | 48k | 1.63 |
| Ex. 5 | 25 | 30 | 41 | 3 | 1 | AIBN | 46k | 1.60 |
| Ex. 6 | 40 | 20 | 36 | 3 | 1 | AIBN | 66k | 1.41 |
| Ex. 7 | 41 | 18 | 37.4 | 2.7 | 0.9 | AIBN | 66k | 1.41 |
| Ex. 8 | 40 | 15 | 39 | 5 | 1 | AIBN | 47k | 1.66 |
| Ex. 9 | 50 | 15 | 29 | 5 | 1 | AIBN | 51k | 1.56 |

Processing Conditions:

Testing solutions were prepared by individually dissolving the polymers of Examples 1 to 10 (SOL 1 to 10) and comparative Example 1 in PGMEA (SOL COMP 1) as a 0.3 wt % solutions and filtered these through a 0.2-micron PTFE filter. These solution were coated on a SiARC, substrate and baked at 220° C./90 s, end then baking at 250° C./5 min in N$_2$, followed by coated the reference block copolymer solution (ref SOL 1), then baking 250° C./2 min in air. The naming of the solutions mirrors the naming of the examples thus SOL 1, to SOL 10 are solution formed from the Examples 1 to 10 and SOL COMP 1 is a sample formed from Comparative Example 1.

Defect Analyses:

Defect Analyses were done by scanning on an Applied Materials NanoSem 3D tool with a procedure to collect 277 SEM images for 2 fields of view (FOV5 & FOV100). Defect images were evaluated as de-wet spots, black dots or white dots, or particles (marked in black). Significant decrease in defects was observed when the % VBA was increased from 1% to 2% comparing SOL 2 to SOL 3. In FIG. 6 the following non-polar pinning layers were compared:

1) SOL COMP 1, P(S-r-VBCB-r-MMA) (30/30/40)
2) SOL 1, P(S-r-VBCB-r-MMA-r-VBA)-OH (34/30/35/1)
3) SOL 2, P(S-r-VBCB-r-MMA-r-VBA)-OH (33/30/35/2)
4) SOL 3, P(S-r-VBCB-r-MMA-r-VBA)-COOH (33/30/35/2)

From Table 2 it is seen that the sample done with the comparative example shows both a very high degree of de-wetting and a high degree of defects compared to the novel composition. Table 2 shows that most of the novel composition retained neutrality towards the overcoated block copolymer of styrene and methyl methacrylate ref SOL 1 (Reference Block Copolymer Synthesis Example 1), loss on neutrality only occurred in Examples 8 and 9 when the VBA is >3 mole %. When the VBA exceeds 3 mole %, a loss of neutrality was observed as the neutral surface becomes a hydrophilic pinning surface. FIG. 6 shows in more detail what was observed in the defect analysis where SOL COMP 1 containing the comparative terpolymer gives a much higher number of defects as indicated by the Dark Grey squares than either the inventive tetrapolymer or pentapolymers as shown respectively by the samples made with SOL 2 and SOL 3.

Table 2 summarizes the performance of compositions containing these materials as neutral layers which were processed as described above:

TABLE 2

Summary of performance and testing of neutral surface P(S-r-VBCB-r-MMA-r-VBA)-X and P(S-r-VBCB-r-MMA-r-VBA-r-HEMA)

| Sample | CA | Film | Neutrality | Defects 100 FOV | 5 FOV |
|---|---|---|---|---|---|
| SOL COMP 1 | 80 | X | Y | 275 | 10 |
| SOL 1 | 78 | Δ | Y | 59 | 3 |
| SOL 2 | 78 | ○ | Y | 1 | 0 |
| SOL 3 | 76 | ○ | Y | 13 | 0 |
| SOL 4 | 81 | ○ | Y | 13 | 0 |
| SOL 5 | 80 | ○ | Y | 10 | 0 |
| SOL 6 | 79 | ○ | Y | 31 | 2 |
| SOL 7 | 76 | ○ | Y | 2 | 1 |
| SOL 8 | 76 | ○ | N | 0 | 0 |
| SOL 9 | 76 | ○ | N | 1 | 0 |

○ = good
X = de-wet
Δ = some de-wet
Y = FP
N = No FP

Examples and Testing of Inventive Hydrophobic (Non-Polar) Mat Layers

Here new hydrophobic pinning mats are disclosed, which were reproducibly produced with controllable synthetic method which are compatible with free-radical polymerization. The following are advantages which were demonstrated for these inventive materials:

Highly hydrophobic crosslinking pinning mat for DSA processing. High contact angles and low film loss characterize this film as ideal for DSA pinning Underlayer film coats with low defects. Low particles and de-wetting defects will improve the DSA process and expand its process window.

Compatibility of hydrophobic pinning underlayer film on SiARC allows for muti-layer application of line multiplication using the spin-on process.

The new copolymers which were investigate to enable robust hydrophobic mat for use in DSA, where copolymer of styrene(S), 4-vinylbenzocyclobutene (VBCB), and 4-vinylbenzoic acid (VBA) initiated by either 4,4'-azobis(4-cyanopentanol) (AIBN-OH) or 4,4'-Azobis(4-cyanovaleric acid) (AIBN-COOH). An improvement in the composition to P(S-r-VBCB-r-VBA)-OH [i.e., hydroxyl-terminated poly(styrene-co-4-vinylbenzobcyclobutene-co-4-vinylbenzoic acid)] or P(S-r-VBCB-r-VBA)-COOH [i.e., carboxylic acid-terminated poly(styrene-co-4-vinylbenzobcyclobutene-co-4-vinylbenzoic acid)] gave hydrophobic crosslinking pinning mats with low coating defects. The S component gave to the polymer the pinning hydrophobicity. FIG. 7 shows a representative example of one of the inventive copolymers which was made. The VBCB component allowed the polymer to crosslink into an insoluble film when baked during processing. Unexpectedly, the VBA component made these copolymers more compatible with SiARC substrates. Additionally, when terminal hydroxyl- or carboxylic acid-terminated end group resulting from initiators containing these moieties were incorporated into these copolymers this allowed it to graft onto the substrate which held the copolymer to the substrate and allowed it to better adhere to the substrate during high temperature bake crosslinking of this copolymer, which further decreased any de-wetting and decreased the level of defects.

An analysis of crosslinked films was done to check for non-neutrality or pinning of the hydrophobic block, specifically for the homo-polystyrene block. This was done by annealing a coating of a Reference Block Copolymer Synthesis Example 1 (ref SOL 1) was annealed on the film to study the self-assembly of the block copolymer. This analysis showed that the block copolymers did not produce a fingerprint, indicating that it adopted a parallel morphology on these novel n-non-polar pinning surface. This partiality of the overlying block copolymer allowed for preferential interaction with the PS-block of diblock copolymers. The coating on SiARC was then analyzed for defects using SEM method (VM277), which showed improved coating with insignificant defects. SEM method VM277 is the process of taking 277 SEM images per wafer and visually inspecting each image for coating defects such as pinholes, black or white spots, and particles. These defects are further analyzed at IMEC (Kapeldreef 75, 3001, Leuven, Belgium) for better quantitation. Finally, the pinning characteristic of these novel non-polar mats was checked by patterning by irradiation lithography and subjected to the LiNe Flow for directed self-assembly of BCP for line multiplication showing that pattern multiplication was affected as demonstrated in FIG. 15 to FIG. 17.

New hydrophobic crosslinking pinning mat compositions P(S-r-VBCB-r-VBA)-OH and P(S-r-VBCB-r-VBA)-COOH (FIG. 7) initiates with AIBN-OH and AIBN-COOH, respectively, which are not commonly used in crosslinking mats. This end group functionality can increase interaction with the substrate in a grafting capacity prior to crosslinking. When AIBN-OH was used as the initiator in place of AIBN, the defects improved from 277/277 to 26/158 (FIG. 10, SOL COMP 2 versus SOL 10). When AIBN-COOH was used as the initiator in place of AIBN, the defects improved from 277/277 to 4/0 (FIG. 10, SOL 11).

4-Vinylbenzoic acid (VBA) was added to the composition to decrease the de-wetting defects of the hydrophobic film on SiARC. As SiARCs are commonly used in the architecture of microchips, compatibility of the film is critical. The polar functionality of VBA improves the adhesion of the hydrophobic film on any surface, thus reducing de-wetting defects. When 0.5 mole % VBA was added to the composition, the defects improved from 277/277 to 83/9 (FIG. 1, SOL 12). When 1.0 mol % VBA was added to the composition, the defects improved from 277/277 to 3/3 (FIG. 10, SOL 13).

A combination of using a functionalized radical initiator AIBN-OH or AIBN-COOH in (1) with 4-vinylbenzoic acid in the composition (2) gave a polymer which showed very little defect when coating on SiARC substrates. When 1.5 mol % VBA was added to the composition initiated by AIBN-COOH, the defects improved from 277/277 to 0/1 (FIG. 10, SOL 14). When 1 mol % VBA was added to the composition initiated by AIBN-OH, the defects improved from 277/277 to 0/0 (FIG. 10, SOL 15).

SEM imaging of new compositions show improved de-wetting defects as compared to Comparative Example 2 (COMP SOL 2) (FIG. 11, Bin 1 and Bin 2 large sized defects) as coated, using the previously described procedure for coating this material. It should be noted that the reference was treated with UV exposure to lower its defects on SiARC. SOL 15 as coated using the previously described procedure for coating this material. shows overall improvement over Comparative Example 2 for Bin 1 and Bin 2 defects as UV treatment was not applied to this sample (FIG. 12).

SOL 14 as coated using the previously described procedure for coating this material shows equal or better improvement over SOL COMP 2 (FIG. 11) for Bin 1 and Bin 2 defects as UV treatment was also not applied to this sample.

SOL 15 (FIG. 12) shows overall improvement over SOL COMP 2 (FIG. 11) for most dies with perfect line multiplication assembly as UV treatment was not applied to this sample.

SOL 14 (FIG. 13) shows better performance over SOL COMP 2 (FIG. 11) when comparing the number of dies with perfect line multiplication assembly as UV treatment was not applied to this sample Directed Self-Assembly (DSA) performance on guiding line prepattern generated using the novel underlayer pinning mats showed better process windows (FIG. 16 and FIG. 17).

Example 10

Synthesis of Poly(styrene-co-4-vinylbenzocyclobutene-co-4-vinylbenzoic acid)-hydroxyl Terminated Styrene (25.0 g, 230 mmol), 4-vinylbenzocyclobutene (2.35 g, 20 mmol), 4,4'-azobis(4-cyanopentanol) (0.63 g, 2.5 mmol) and methylisobutylketone (42 g) were added into a flask and degassed three times using the freeze-thaw technique. The mixture was heated in an 85° C. oil bath for 16 hours. The mixture was cooled to room temperature and diluted with THF before precipitating in isopropanol. The polymer was collected and re-dissolved in THF as a 15% solids solution and precipitated in isopropanol. The polymer was collected and dried in a vacuum over at 70° C. 18.0 g (65.3%) white powder, GPC: 12,992 g/mol Mn, 22,621 g/mole Mw, 1.74 PDI.

Example 11

Synthesis of Poly(styrene-co-4-vinylbenzocyclobutene-co-4-vinylbenzoic acid)-carboxylic Acid Terminated Styrene (24.8 g, 240 mmol), 4-vinylbenzocyclobutene (2.34 g, 20 mmol), 4,4'-azobis(4-cyanovaleric acid) (0.84 g, 3 mmol) and methylisobutylketone (42 g) were added into a flask and degassed three times using the freeze-thaw technique. The mixture was heated in an 85° C. oil bath for 16 hours. The mixture was cooled to room temperature and diluted with THF before precipitating in isopropanol. The polymer was collected and re-dissolved in THF as a 15% solids solution and precipitated in isopropanol. The polymer was collected and dried in a vacuum over at 70° C. 18.0 g (65.3%) white powder, GPC: 8,571 g/mol Mn, 14,280 g/mole Mw, 1.67 PDI.

Example 12

Synthesis of Poly(styrene-co-4-vinylbenzocyclobutene-co-4-vinylbenzoic acid)

Styrene (35.7 g, 340 mmol), 4-vinylbenzocyclobutene (3.37 g, 30 mmol), 4-vinylbenzoic acid (0.27 g, 1.9 mmol), 4,4'-azobis(2-methylpropionitrile) (0.69 g, 4.2 mmol) and methylisobutylketone (60 g) were added into a flask and degassed three times using the freeze-thaw technique. The mixture was heated in an 85° C. oil bath for 16 hours. The mixture was cooled to room temperature and diluted with THF before precipitating in isopropanol. The polymer was collected and re-dissolved in THF as a 15% solids solution and precipitated in isopropanol. The polymer was collected and dried in a vacuum over at 70° C. 18.0 g (65.3%) white powder, GPC: 10,711 g/mol Mn, 17,888 g/mole Mw, 1.67 PDI.

Example 13

Synthesis of Poly(styrene-co-4-vinylbenzocyclobutene-co-4-vinylbenzoic acid)

Styrene (35.4 g, 340 mmol), 4-vinylbenzocyclobutene (3.37 g, 30 mmol), 4-vinylbenzoic acid (0.55 g, 3.7 mmol), 4,4'-azobis(2-methylpropionitrile) (0.69 g, 4.2 mmol) and methylisobutylketone (60 g) were added into a flask and degassed three times using the freeze-thaw technique. The mixture was heated in an 85° C. oil bath for 16 hours. The mixture was cooled to room temperature and diluted with THF before precipitating in isopropanol. The polymer was collected and re-dissolved in THF as a 15% solids solution and precipitated in isopropanol. The polymer was collected and dried in a vacuum over at 70° C. 18.0 g (65.3%) white powder, GPC: 9,719 g/mol Mn, 17,591 g/mole Mw, 1.81 PDI.

Example 14

Synthesis of Poly(styrene-co-4-vinylbenzocyclobutene-co-4-vinylbenzoic acid)-carboxylic Acid Terminated Styrene (24.3 g, 230 mole), 4-vinylbenzocyclobutene (2.32 g, 20 mmol), 4-vinylbenzoic acid (0.57 g, 3.8 mmol), 4,4'-azobis(4-cyanovaleric acid) (0.82 g, 2.9 mmol) and methylisobutylketone (42 g) were added into a flask and degassed three times using the freeze-thaw technique. The mixture was heated in an 85° C. oil bath for 16 hours. The mixture was cooled to room temperature and diluted with THF before precipitating in isopropanol. The polymer was collected and re-dissolved in THF as a 15% solids solution and precipitated in isopropanol. The polymer was collected and dried in a vacuum over at 70° C. 18.0 g (65.3%) white powder, GPC: 12,311 g/mol Mn, 20,879 g/mole Mw, 1.696 PDI.

Example 15

Synthesis of Poly(styrene-co-4-vinylbenzocyclobutene-co-4-vinylbenzoic acid)-hydroxyl Terminated Styrene (24.6 g, 240 mmol), 4-vinylbenzocyclobutene (2.34 g, 20 mmol), 4-vinylbenzoic acid (0.38 g, 2.6 mmol), 4,4'-azobis(4-cyanopentanol) (0.70 g, 2.8 mmol) and methylethylketone (42 g) were added into a flask and degassed by sparging with nitrogen for 30 minutes. The mixture was heated to reflux in a 90° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 14.4 g (52.3%) white powder, GPC: 13,236 g/mol Mn, 25,535 g/mole Mw, 1.93 PDI.

Example 16

Synthesis of Poly(styrene-co-4-vinylbenzocyclobutene-co-4-vinylbenzoic acid)-hydroxyl Terminated Styrene (23.1 g, 220 mmol), 4-vinylbenzocyclobutene (1.56 g, 10 mmol), 4-vinylbenzoic acid (0.35 g, 2.4 mmol), methacrylolsobutyl POSS (2.25 g, 2.4 mmol), 4,4'-azobis(4-cyanopentanol) (0.70 g, 2.8 mmol) and methylethylketone (42 g) were added into a flask and degassed by sparging with nitrogen for 30 minutes. The mixture was heated to reflux in a 90° Coil bath for 16 hours. The mixture was cooled to room temperature and diluted two-fold with THF before precipitating in isopropanol. The polymer was collected and re-dissolved in THF as a 15% solids solution and precipitated in isopropanol. The polymer was collected and dried in a vacuum over at 70° C. 14.2 g (52.1%) white powder, GPC: 14,148 g/mol Mn, 23,558 g/mole Mw, 1.67 PDI.

Examples and Testing of Inventive Neutral Layer for Contact Hole Self-Assembly of a Block Polymer Reference Block Copolymer Synthesis Example 2 Synthesis of P(S-b-MMA) (62k-b-25k)

P(S-b-MMA) (62K-b-25K) was synthesized using the same procedure as described in example 2. To achieve target Mn and compositions of PS and PMMA block, the amount of initiator and monomer quantities were changed. Briefly, 20 g (192 mmol) of styrene was polymerized with 4.38 mL (1.4M solution) of sec-butyllithium. Then 0.07 g (0.38 mmol) of 1,1'-diphenylethylene (DPE) in 2.5 ml of dry toluene was added via ampule into the reactor. The orange color of the reaction mixture turned into dark brick-red indicating conversion of styryllithium active centers to delocalized DPE adduct carbanion. After 2 min of stirring, a small amount (2 mL) of the reaction mixture was withdrawn for PS block molecular weight analysis. Then methyl methacrylate (8.10 g, 81 mmol) was added via ampule. The reaction was terminated after 30 min with 1 mL of degassed methanol. The block copolymer was recovered by precipitation in excess isopropanol (5 times of the polymer solution) containing 10% water, filtered, and dried at 55° C. for 12 h under vacuum giving 26.5 g of P(S-b-MMA) (94% yield) consisting of 70.1 mol. % of polystyrene block and 29.9 mol. % of polymethylmethacrylate block. The diblock copolymer molecular weight obtained from GPC is Mn=86,518 g/mol and Mw/Mn=1.01.

Reference Block Copolymer Solution (Ref SOL 2)

Reference Block Copolymer Synthesis Examples 2 was dissolved into in PGMEA as a 1.7 wt. % solutions and filtered these through a 0.2-micron PTFE filter. This solution was employed in the testing of the inventive neutral layer composition for effectiveness for self-assembly of contact holes (e.g. Ex 17 to 25 as reported in Table 5 and 6) and as described as follows:

Example 17

Synthesis of Poly(styrene-co-4-vinylbenzocyclobutene-co-methyl methacrylate-co-4-vinylbenzoic acid)-hydroxyl Terminated (39/35/25/1 Feed)

Styrene (35.7 g, 0.34 mole), 4-vinylbenzocyclobutene (40.0 g, 0.31 mole), methyl methacrylate (22.0 g, 0.22 mole), 4-vinylbenzoic acid (1.30 g, 8.80 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 18.0 g (65.3%) white powder, GPC: 21,270 g/mol Mn, 47,875 g/mole Mw, 2.25 PDI.

Example 18

Synthesis of Poly(styrene-co-4-vinylbenzocyclobutene-co-methyl methacrylate-co-4-vinylbenzoic acid)-hydroxyl Terminated (33/30/35/1 Feed)

Styrene (18.3 g, 0.18 mole), 4-vinylbenzocyclobutene (20.8 g, 0.16 mole), methyl methacrylate (18.7 g, 0.19 mole), 4-vinylbenzoic acid (1.58 g, 10.7 mmole), 4,4'-azobis(4-cyanopentanol) (0.59 g, 2.35 mmole) and 2-butanone (90 g) were added into a flask and sparged with nitrogen for 30 minutes. The mixture was heated in a 85° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 32.0 g (54%) white powder, GPC: 13,391 g/mol Mn, 24,461 g/mole Mw, 1.83 PDI.

Example 19

Synthesis of Poly(styrene-co-4-vinylbenzocyclobutene-co-methyl methacrylate-co-4-vinylbenzoic acid)-hydroxyl Terminated (38/35/25/2 feed)

Styrene (34.1 g, 0.33 mole), 4-vinylbenzocyclobutene (39.4 g, 0.30 mole), methyl methacrylate (21.6 g, 0.22 mole), 4-vinylbenzoic acid (3.84 g, 17.3 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 64 g (64%) white powder, GPC: 13,256 g/mol Mn, 24,824 g/mole Mw, 1.95 PDI.

Example 20

Synthesis of Poly(styrene-co-4-vinylbenzocyclobutene-co-methyl methacrylate-co-4-vinylbenzoic acid)-hydroxyl Terminated (48/35/15/2 Feed)

Styrene (43.0 g, 0.41 mole), 4-vinylbenzocyclobutene (39.2 g, 0.30 mole), methyl methacrylate (12.9 g, 0.13 mole), 4-vinylbenzoic acid (3.83 g, 17.2 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 53 g (53%) white powder, GPC: 10,572 g/mol Mn, 22,685 g/mole Mw, 2.15 PDI.

Example 21

Synthesis of Poly(styrene-co-4-vinylbenzocyclobutene-co-methyl methacrylate-co-4-vinylbenzoic acid)-hydroxyl Terminated (48/35/15/2 Feed)

Styrene (43.6 g, 0.42 mole), 4-vinylbenzocyclobutene (39.7 g, 0.31 mole), methyl methacrylate (13.1 g, 0.13 mole), 4-vinylbenzoic acid (2.58 g, 17.4 mmole), 4,4'-azobis(4-cyanopentanol) (0.99 g, 3.92 mmole) and 2-butanone (60 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 41 g (41%) white powder, GPC: 16,902 g/mol Mn, 40,958 g/mole Mw, 2.42 PDI.

Example 22

Synthesis of Poly(styrene-co-4-vinylbenzocyclobutene-co-methyl methacrylate-co-4-vinylbenzoic acid)-hydroxyl Terminated (68/15/15/2 Feed)

Styrene (64.7 g, 0.62 mole), 4-vinylbenzocyclobutene (17.9 g, 0.14 mole), methyl methacrylate (13.7 g, 0.14 mole), 4-vinylbenzoic acid (2.71 g, 18.3 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 45 g (45%) white powder, GPC: 23,381 g/mol Mn, 42,354 g/mole Mw, 1.81 PDI.

Example 23

Synthesis of Poly(styrene-co-4-vinylbenzocyclobutene-co-methyl methacrylate-co-4-vinylbenzoic acid)-hydroxyl Terminated (35/53/10/2 Feed)

Styrene (30.1 g, 0.29 mole), 4-vinylbenzocyclobutene (57.0 g, 0.44 mole), methyl methacrylate (8.27 g, 0.08 mole), 4-vinylbenzoic acid (3.67 g, 16.5 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 49 g (49%) white powder, GPC: 14,246 g/mol Mn, 26,302 g/mole Mw, 1.84 PDI.

Example 24

Synthesis of Poly(styrene-co-4-vinylbenzocyclobutene-co-methyl methacrylate-co-4-vinylbenzoic acid)-hydroxyl Terminated (13/30/55/2 Feed)

Styrene (12.1 g, 0.12 mole), 4-vinylbenzocyclobutene (35.0 g, 0.27 mole), methyl methacrylate (49.3 g, 0.49 mole), 4-vinylbenzoic acid (2.65 g, 17.9 mmole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted with THF and precipitated in isopropanol. The polymer was collected and re-dissolved in THF as a 15% solids solution and precipitated in isopropanol. The polymer was collected and dried in a vacuum overnight at 70° C. 28 g (59%) white powder, GPC: 14,877 g/mol Mn, 32,134 g/mole Mw, 2.16 PDI.

Example 25

Synthesis of Poly(styrene-co-4-vinylbenzocyclobutene-co-methyl methacrylate-co-4-vinylbenzoic acid)-hydroxyl Terminated (33/30/34/3 Feed)

Styrene (29.8 g, 0.29 mole), 4-vinylbenzocyclobutene (33.9 g, 0.26 mole), methyl methacrylate (29.5 g, 0.30 mole), 4-vinylbenzoic acid (3.86 g, 26.0 mmole), 4,4'-azobis(4-cyanopentanol) (2.91 g, 1.15 mmole) and 2-butanone (150 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 52 g (52%) white powder, GPC: 14,277 g/mol Mn, 23,518 g/mole Mw, 1.65 PDI.

Comparative Example 2

Synthesis of Poly(styrene-co-4-vinylbenzocyclobutene)

In a 250 mL 4-neck round bottomed flask equipped with a stir bar, a reflux condenser, a temperature controller and a nitrogen sparging tube, styrene (630 g, 6.05 moles), 4-vinylbenzocyclobutene (59.30 g, 0.46 moles), 2,2'-azobis(2-methylpropionitrile) (10.35 g, 63 mmol) and 2-butanone (MEK, 1050 g) were added. The reaction mixture was stirred while nitrogen was sparged in for 1.0 hour. The mixture was heated in a 90° C. oil bath and stirred for 20 hours. The mixture was cooled, then slowly precipitated in iPrOH (15 L). The precipitate was collected by vacuum filtration and oven dried. The residue was re-dissolved in THF (15% solids) and precipitated in MeOH (15 L) once again. The precipitate was collected by vacuum filtration and oven dried. The polymer is an off-white solid, 450 g (64.0% yield). GPC: 9,452 g/mol Mn, 18,053 g/mol Mw, 1.91 PDI.

Comparative Example 3

Synthesis of Poly(styrene-co-4-vinylbenzocyclobutene-co-methyl methacrylate)-hydroxyl terminated (30/30/40 feed)

Styrene (28.0 g, 0.27 mole), 4-vinylbenzocyclobutene (35.0 g, 0.27 mole), methyl methacrylate (35.9 g, 0.36 mole), 4,4'-azobis(4-cyanopentanol) (0.99 g, 3.92 mmole) and 2-butanone (150 g) were added into a flask and sparged with nitrogen for 30 minutes. The mixture was heated in a 85° C. oil bath for 16 hours. The mixture was cooled to room temperature and diluted two-fold with THF before precipitating in isopropanol. The polymer was collected and redissolved in THF as a 15% solids solution and precipitated in isopropanol. The polymer was collected and dried in a vacuum over at 70° C. 26 g (26%) white powder, GPC: 26,113 g/mol Mn, 43,631 g/mole Mw, 1.67 PDI. The comparative example showed the effect of the exclusion of a repeat unit repeat unit derived from 4-vinyl benzoic acid.

Polymer Characterization

Table 3 gives a summary of the characterization data for both Inventive polymers 10 to 16 and also for Comparative Example 2.

TABLE 3

Summary of polymer characterization of P(S-r-
VBCB-r-VBA)-X and P(S-r-VBCB-r-VBA-r-POSS-MA)

| Sample | S | VBCB | VBA | POSS-MA | Initiator | Mw | PDI |
|---|---|---|---|---|---|---|---|
| Comp Ex. 2 | 93 | 7 | 0 | 0 | AIBN | 19k | 1.90 |
| Ex. 10 | 93 | 7 | 0 | 0 | AIBN-OH | 23k | 1.74 |
| Ex. 11 | 93 | 7 | 0 | 0 | AIBN-COOH | 14k | 1.72 |
| Ex. 12 | 92.5 | 7 | 0.5 | 0 | AIBN | 18k | 1.67 |
| Ex. 13 | 92 | 7 | 1 | 0 | AIBN | 18k | 1.81 |
| Ex. 14 | 91.5 | 7 | 1.5 | 0 | AIBN-COOH | 21k | 1.81 |
| Ex. 15 | 92 | 7 | 1 | 0 | AIBN-OH | 26k | 1.93 |
| Ex. 16 | 93 | 5 | 1 | 1 | AIBN | 24k | 1.67 |

Testing of Novel Non-Polar Pinning Layers

Table 4 shows a summary of the defect testing which was done on non-polar pining layers which were made with the inventive VBA containing polymers described in Examples 12 to 17 and for which was prepared with the copolymer of Comparative Example 2.

In the experiments summarized in Table 4 testing solutions were prepared by individually dissolving the copolymers of Examples 12 to 17 and Comparative Example 2 in PGMEA as a 0.3 wt % solutions and filtered these through a 0.2 µm PTFE filter. The naming of the solutions mirrors the naming of the examples thus SOL 12, to SOL 17 are solution formed from the Examples 12 to 17 and SOL COMP 2 is a sample formed from Comparative Examples 2.

The film thickness (FT) was measured using JA Woollam M-2000 Ellipsometer. The measurement of the film thickness pre- and post-rinse with PGMEA will determine the robustness of the film. The Neutrality testing-Processing conditions were to coat the solution on: SiARC, bake at 220° C./90 s, coat novel mat, bake 250° C./5 min in $N_2$, coat ref SOL 1 bake 250° C./5 min in $N_2$. The neutrality was determined by the presence (neutral) or absence (non-neutral) of perpendicular morphology (fingerprint) of the BCP. Details of processing conditions are shown in the section entitled "General Processing Conditions."

Coating Defect Analyses by LPC of Non-Polar Pinning Layer

Figure 10:
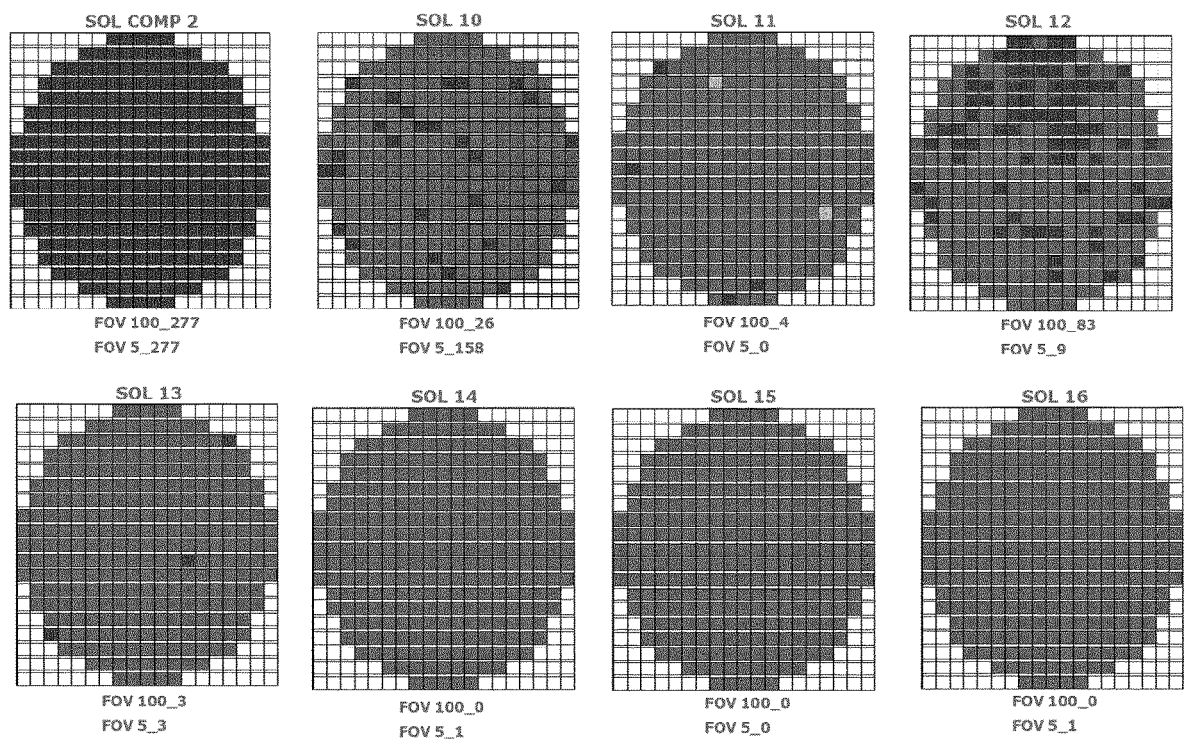

FIG. 10 shows the results which were obtained in the coating defect analysis with SOL 10 to 16 and COMP SOL 2. The dark greyish black designate areas with defects. This analysis was done by coating SiARC and baking at 220° C./90 s, then individually coating with SOL 10 to 16 or with COMP SOL 2 and individually baking the copolymer coating at 250° C./5 min in $N_2$, to form the crosslinked non-polar pinning layers test samples. These wafers were then subjected to the VM277 SEM method to analyze for coating defects. These non-polar pinning tested samples were finally coated with the block copolymer solution (ref SOL 1), baked at 250° C./5 min in $N_2$ to check for neutrality.

Defect Analyses were done by scanning on a Applied Materials NanoSem 3D tool with a procedure to collect 277 images for 2 fields of view (F0V5 & FOV100). Defect images were evaluated as de-wet spots, black dots or white dots, or particles (marked in black). Questionable small defects were marked in light grey in FIG. 10. Significant improvements in defects were observed with the change in the initiator end groups, hydroxyl-terminated and carboxylic acid-terminated (SOL 10 and SOL 11, respectively). Gradually increasing the % VBA to 0.5 and 1.0% into the hydrophobic composition improved the defect counts (SOL 12 and SOL 13, respectively). A combination of these elements gave extremely low defects, SOL 14 to SOL 16. In FIG. 10 the following non-polar pinning layers were compared:

1) SOL COMP 2, P(S-r-VBCB) (93/7)
2) SOL 10, P(S-r-VBCB)-OH (93/7)
3) SOL 11, P(S-r-VBCB)-COOH (93/7)
4) SOL 12, P(S-r-VBCB-r-VBA) (92.5/7/0.5)
5) SOL 13, P(S-r-VBCB-r-VBA) (92/7/1)
6) SOL 14, P(S-r-VBCB-r-VBA)-COOH (91.5/7/1.5)
7) SOL 15, P(S-r-VBCB-r-VBA)-OH (92/7/1)
8) SOL 16, P(S-r-VBCB-r-VBA-r-POSSMA)-OH (95/5/1/1)

Details on the procedures used for Defect Analysis are shown in the section entitled "General Defect Analyses Procedure."

Table 4 summarizes the performance of compositions containing these materials as hydrophobic pinning layers which were processed as described above:

As demonstrated in FIG. 10 by the observable defects count on the surface of this novel pinning mat, VBA-containing compositions improved the surface of the neutral film on SiARC.

TABLE 4

Summary of performance and testing of non-polar pinning
P(S-r-VBCB-r-VBA)-X and P(S-r-VBCB-r-VBA-r-POSS-MA)

| | | | | Defects | |
|---|---|---|---|---|---|
| Sample | CA | Film | Neutrality | 100 FOV | 5 FOV |
| SOL COMP 2 | 79 | X | N | 277 | 277 |
| SOL 10 | 87 | Δ | N | 26 | 158 |
| SOL 11 | 86 | ○ | N | 4 | 0 |
| SOL 12 | 87 | Δ | N | 83 | 9 |
| SOL 13 | 87 | ○ | N | 3 | 3 |
| SOL 14 | 88 | ○ | N | 0 | 1 |
| SOL 15 | 84 | ○ | N | 0 | 0 |
| SOL 16 | 97 | ○ | N | 0 | 1 |

○ = good
X = de-wet
Δ = some de-wet
Y = FP
N = No FP

Table 5 gives a summary of the characterization data for both Inventive polymers 17 to 25 and also for Comparative Example 3.

TABLE 5

Summary of polymer characterization of P(S-r-VBCB-r-MMA-r-VBA)-OH

| Sample | S | VBCB | MMA | VBA | Initiator | Mw | PDI |
|---|---|---|---|---|---|---|---|
| Comp Ex. 3 | 30 | 30 | 40 | 0 | AIBN-OH | 44k | 1.67 |
| Ex. 1 | 34 | 30 | 35 | 1 | AIBN-OH | 25k | 1.71 |
| Ex. 17 | 39 | 35 | 25 | 1 | AIBN-OH | 42k | 2.18 |
| Ex. 18 | 30 | 30 | 38 | 2 | AIBN-OH | 24k | 1.83 |
| Ex. 19 | 33 | 30 | 35 | 2 | AIBN-OH | 25k | 1.95 |
| Ex. 20 | 38 | 35 | 25 | 2 | AIBN-OH | 23k | 2.15 |
| Ex. 21 | 38 | 35 | 25 | 2 | AIBN-OH | 41k | 2.42 |
| Ex. 22 | 68 | 15 | 15 | 2 | AIBN-OH | 29k | 1.99 |
| Ex. 23 | 35 | 53 | 10 | 2 | AIBN-OH | 26k | 1.84 |
| Ex. 24 | 13 | 30 | 55 | 2 | AIBN-OH | 32k | 2.16 |
| Ex. 25 | 33 | 30 | 34 | 3 | AIBN-OH | 24k | 1.65 |

Figure 11:
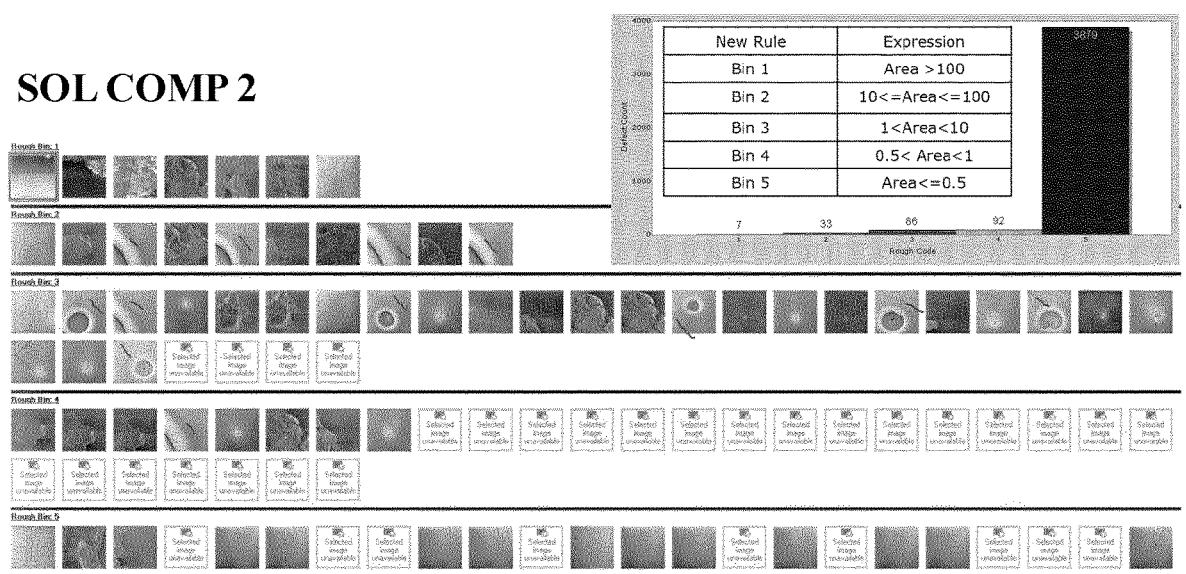
Figure 12:
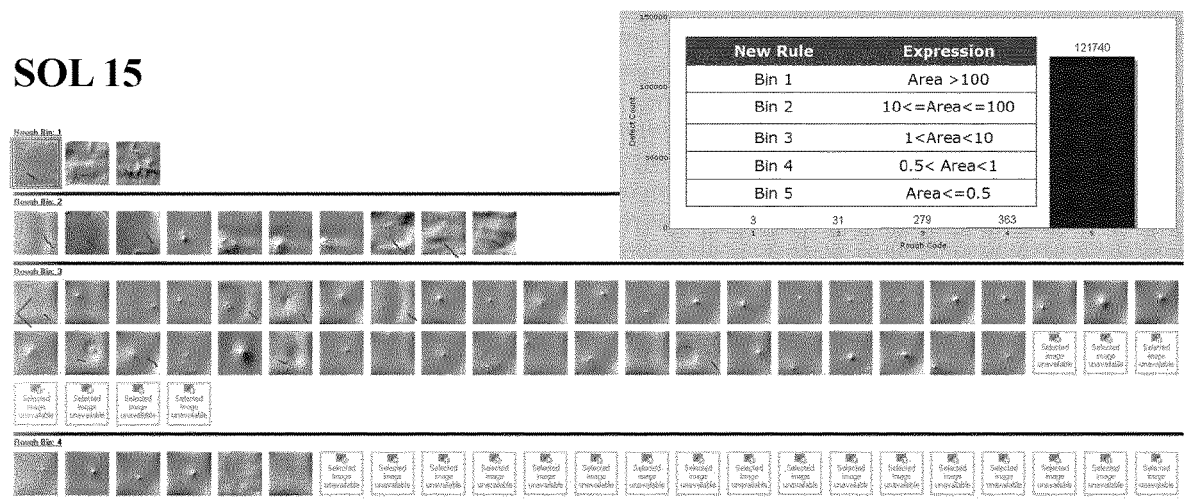
Figure 13:
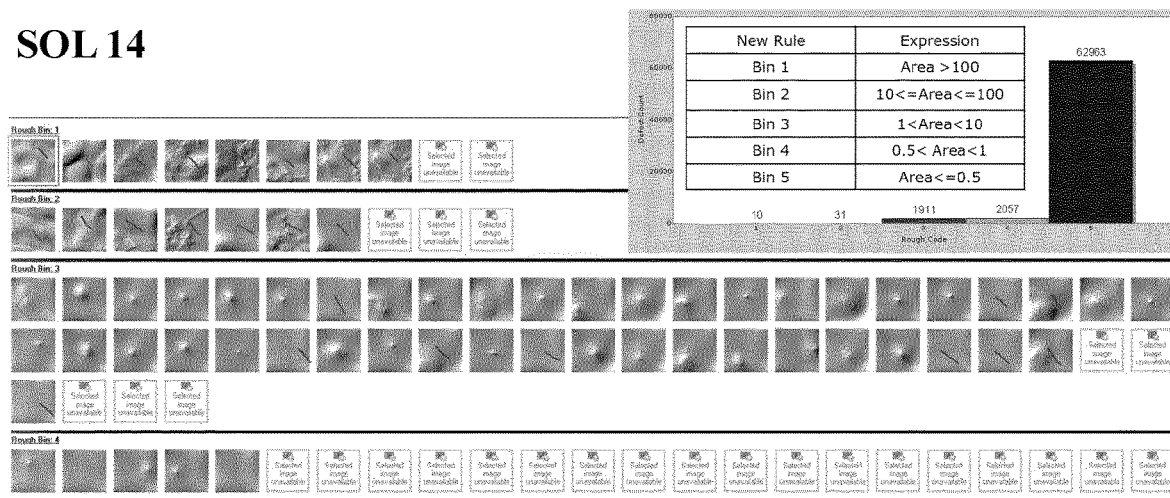

Defect counts were also obtained at IMEC using the SP5 defect tool as shown in FIGS. 11, 12 and 13 for SOL COMP 2, SOL 15 and SOL 14, respectively. SEM images of the defects were taken to analyze the type of defect detected by the SP5 tool. The largest Bin 1 defects were attributed to de-wetting defects of the hydrophobic film on SiARC. Overall, the new Inventive polymers show lower defects counts than the reference polymer. Details on the procedures used for Defect Analysis are shown in the section entitled "General Defect Analyses Procedure."

The processing used at IMEC for FIGS. 11 to 13 was as follows: Coat SiARC on clean bare Si wafer, bake at 220° C./90 s, coat, respectively, the SOL material which was used in FIG. 11 and FIG. 13 (a.k.a Comp SOL 2 and SOL 14), bake 250° C./90 min in $N_2$. Defect Analyses: Wafers were scanned on KLA Tencor 2935 as optical defect inspection tool. Inspected defects were reviewed by KLA Tencor EDR7380 and Defect images were evaluated as de-wet spots, convex, concave or particles. De-wet spots are marked in red.

Figure 1:
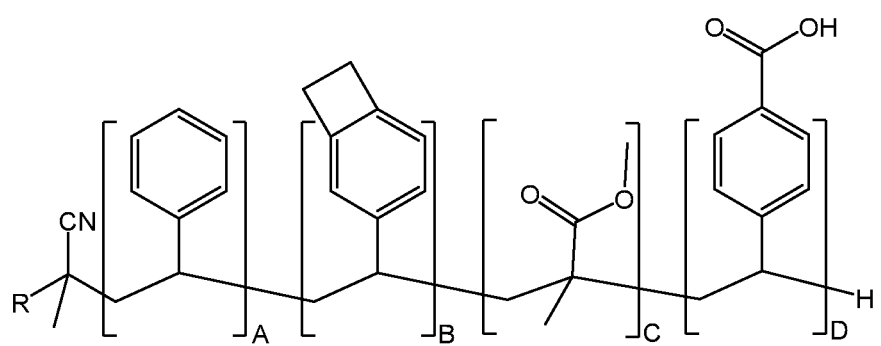
Figure 2:
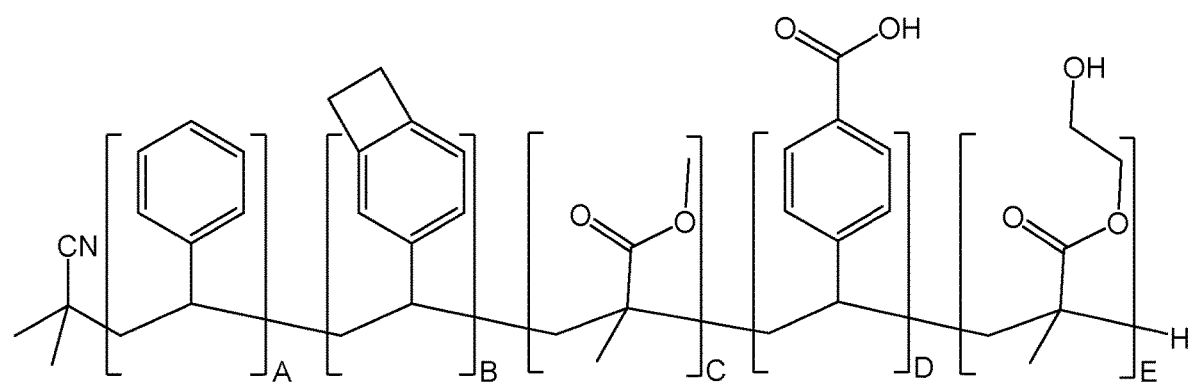
Figure 3:
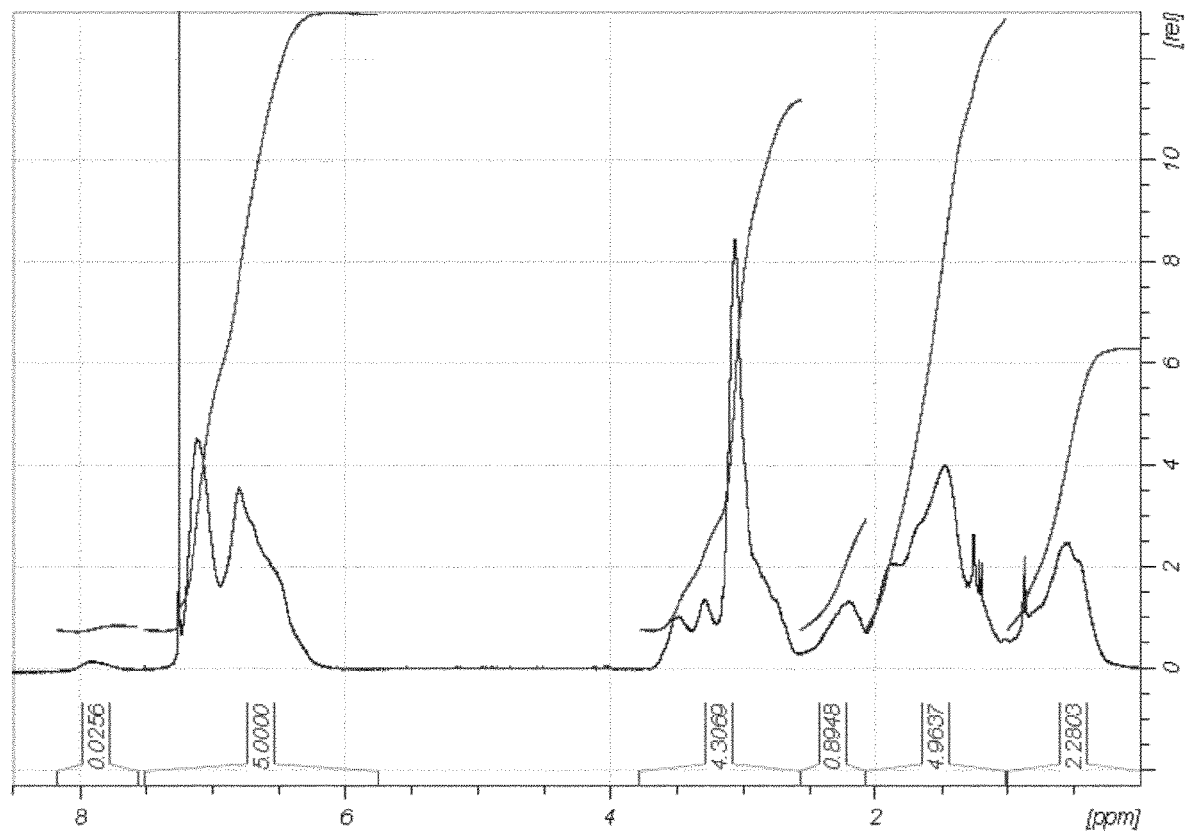
Figure 4:
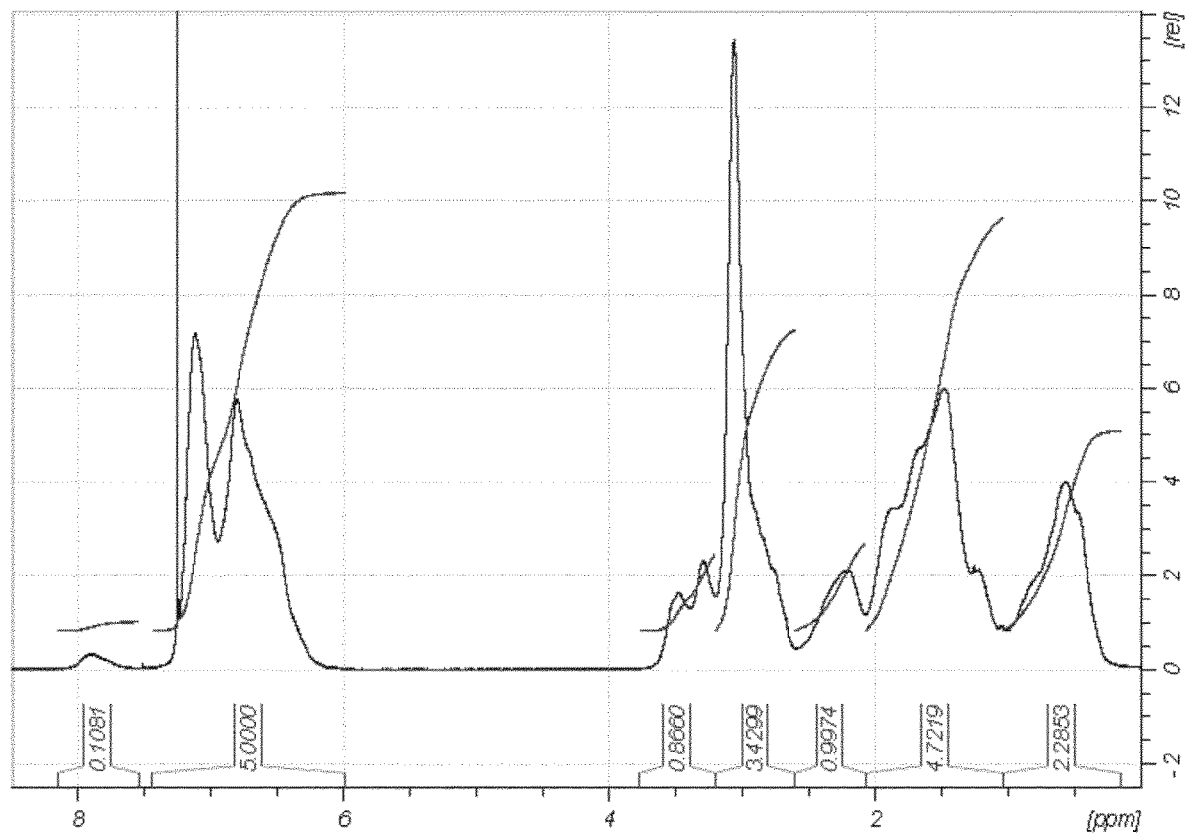
Figure 5:
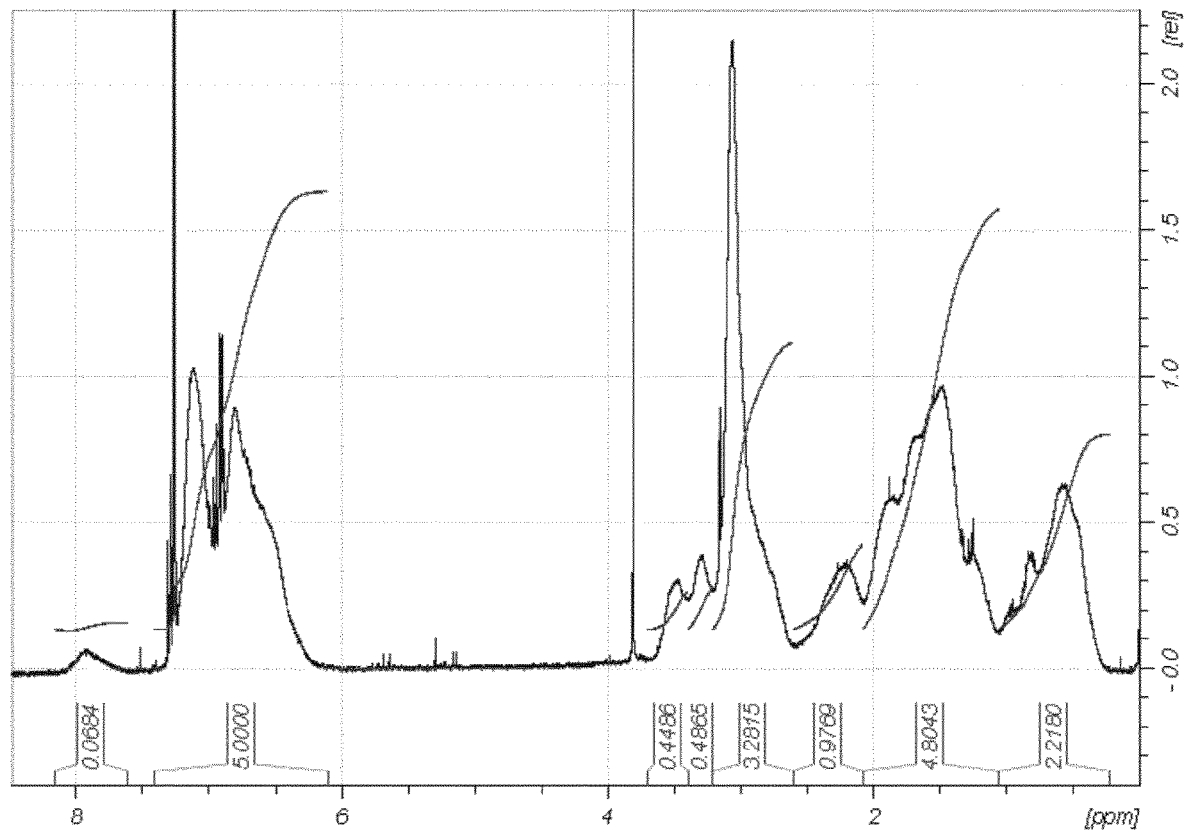
Figure 6:
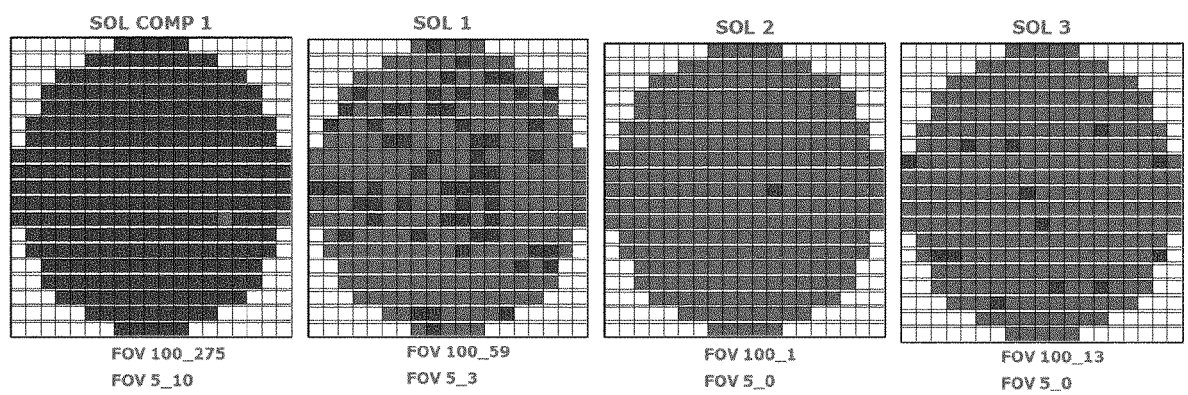
Figure 7:
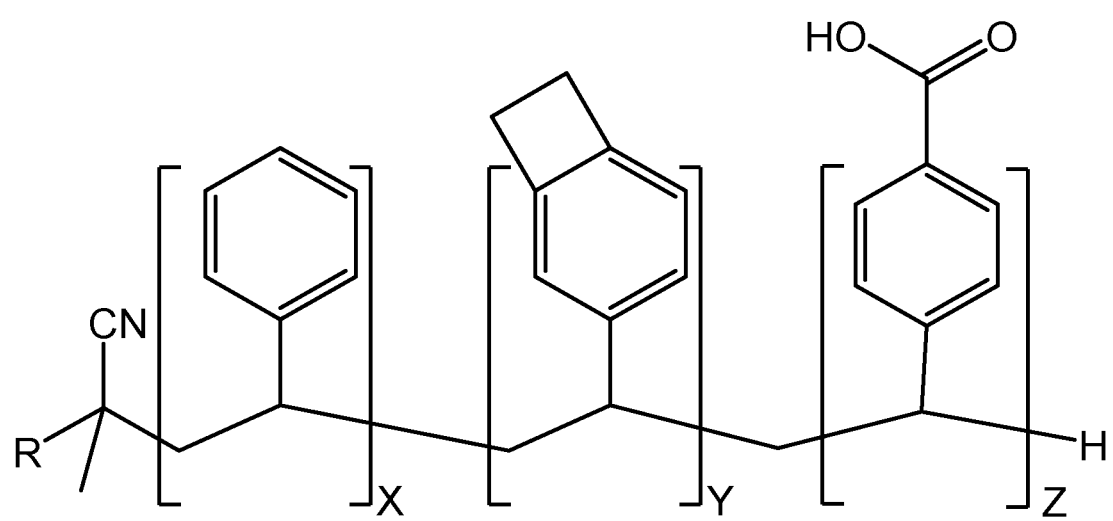
Figure 8:
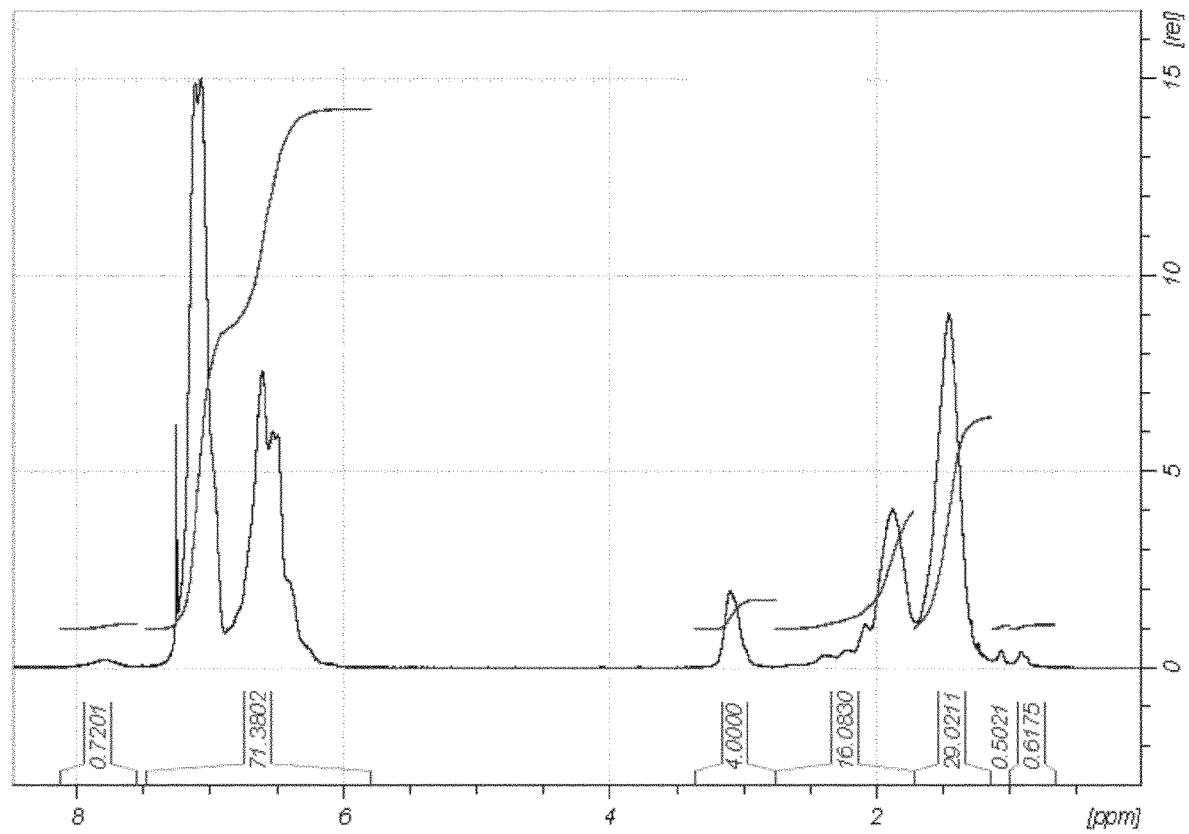
FIG. 8 shows a representative $^1$H NMR spectra for a P(S-r-VBCB-r-VBA)-COOH polymer (a.k.a. Examples 11 and 14), this spectrum was for Example 14.
Figure 9:
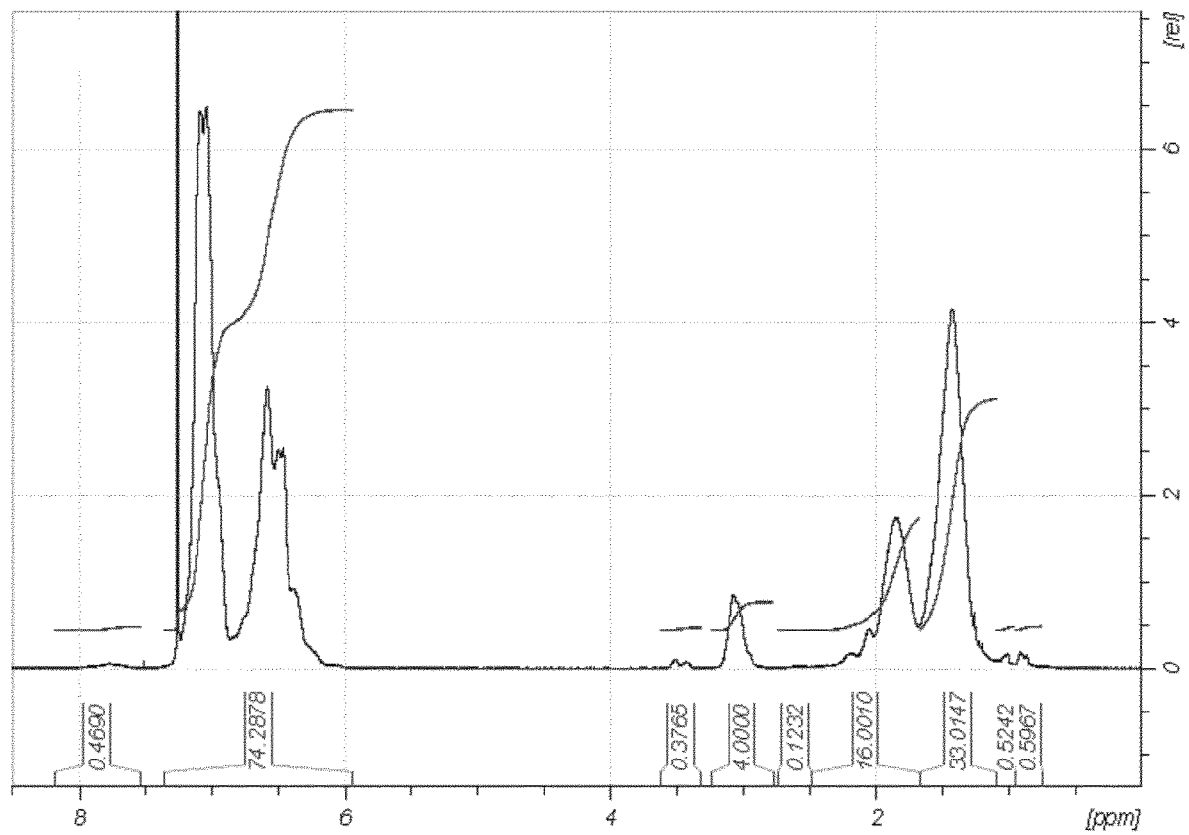
FIG. 9 shows a representative $^1$H NMR spectra for a P(S-r-VBCB-r-VBA)-OH polymer. (a.k.a. Examples 10, 15 and 16) this spectrum was for Example 15.
Figure 14:
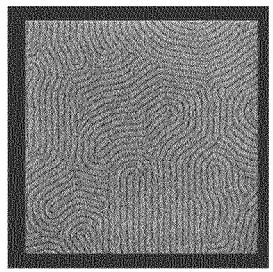
Figure 14:
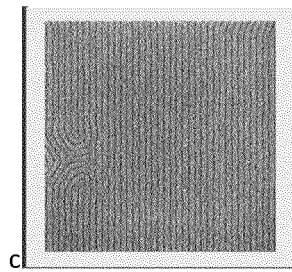
Figure 14:
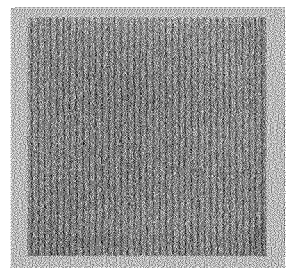
Figure 15:
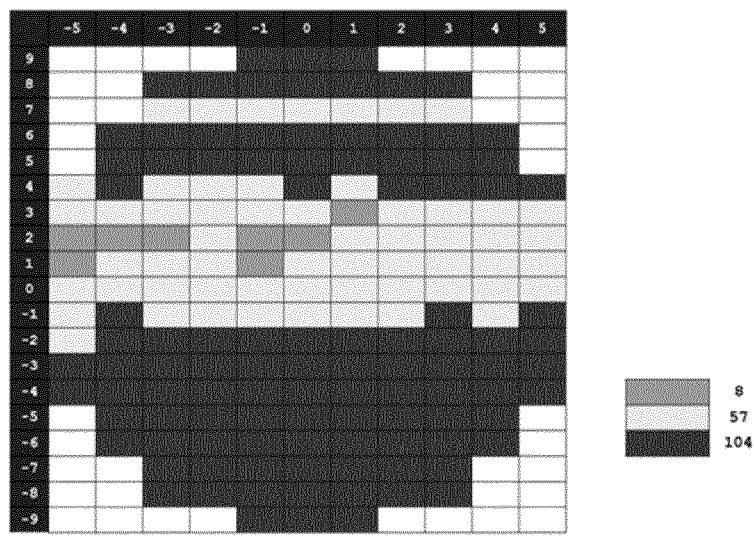
Figure 16:
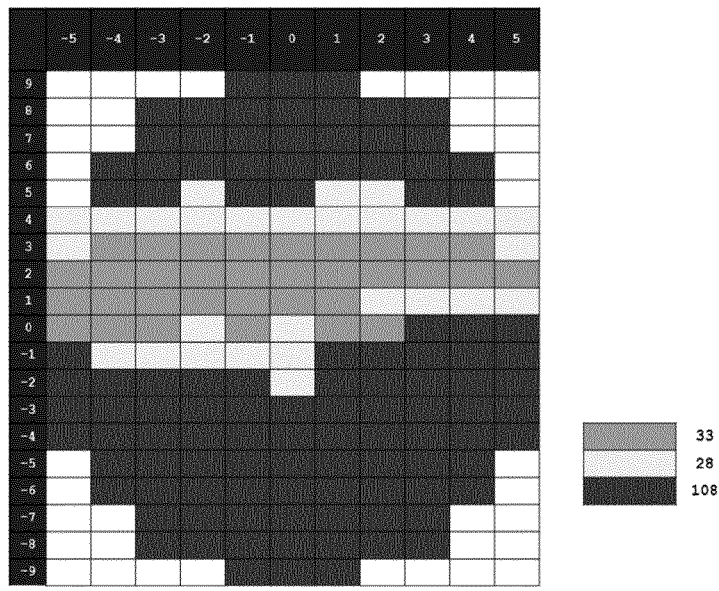

FIG. 14 shows the key to the greytone color schemes for defect status as indicated in FIG. 15 (SOL COMP 2), FIG. 16 (SOL 15) and FIG. 1 (SOL 14). The black squares show no alignment, the light grey squares show mostly aligned lines, and the grey squares show completely aligned lines. These Figures showed the alignment quality of the new non-polar pinning compositions, SOL 15 and SOL 14, as compared to the reference SOL COMP 2.

Figure 17:
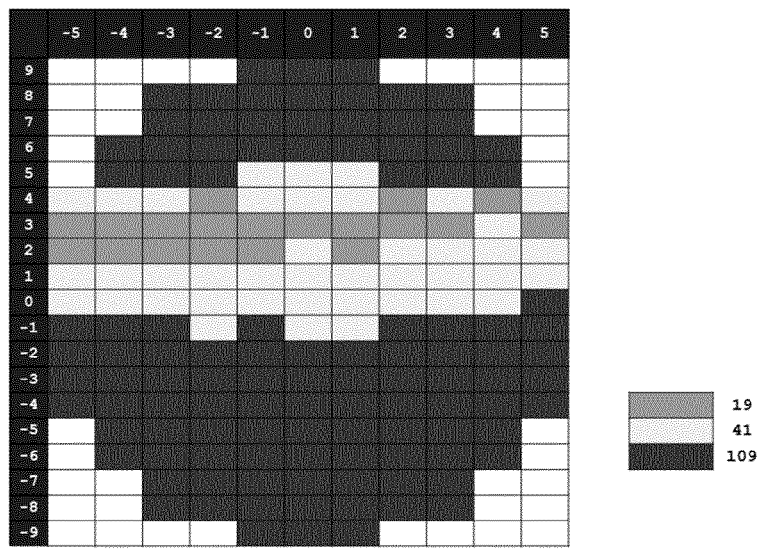

The processing used at IMEC for FIGS. 15 to 17 was as follows:
Coat a SOC (spin on carbon material) & then the SiARC, bake at 250° C./90 s & 220° C./90 s in Air, coat, respectively, the SOL material which was used in FIG. 15 and FIG. 17 (a.k.a SOL COMP 2 and SOL 14), bake 250° C./90 min in $N_2$, Coat photoresist, bake at 120° C./60 s, Exposed at ASML iArF scanner, Developed by TMAH 2.38 wt %, coated SOL COMP 2 or SOL 14 individually etched with $N_2/O_2$ chemistry at LAM E5 dry etcher, Photoresist strip at DNS cleaning tool, Coat neutral layer, bake at 250° C./5 min in $N_2$, Rinse out neutral layer by PGMEA, coat the solution of ref SOL 1 (Reference Block Copolymer Synthesis Example 1) (BCP), bake 250° C./30 min in $N_2$ DSA Process Window Analyses: Wafers were scanned on Hitachi CD-SEM with a procedure to collect 169 images. DSA images were evaluated as perfect assembly, partial assembly or no assembly (marked in Black, Light Grey or Grey. FIG. 14 shows the key to the greytone color schemes for defect status as indicated in FIG. 15 (SOL COMP 2), FIG. 16 (SOL 15) and FIG. 17 (SOL 14). These Figures Defined DSA process window by confirming pattern CD on perfect assembly dies for understanding capability of novel underlayer as pinning material. The novel underlayer pinning mat was coated onto SiARC and patterned using ArF lithography to generate pinning line guiding pattern. A neutral brush polymer was then coated onto the wafer to introduce a non-partial surface. The diblock copolymer was then annealed on the patterned wafer to generate three-fold line multiplication of 90 nm 1:1 L/S features.

Figure 18:
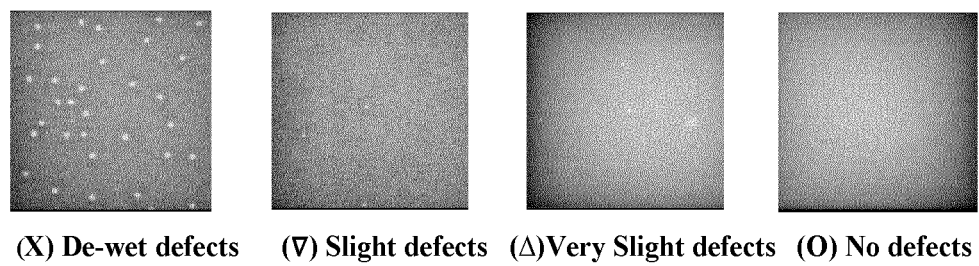

General Processing Conditions:

Testing solutions were prepared by individually dissolving the polymers of Examples 1 and 17 to 25 (SOL 1 and SOL 17 to 25) and comparative Example 3 in PGMEA (SOL COMP 3) as a 0.3 wt % solutions and filtered these through a 0.2-micron PTFE filter. Two different SiARCs (ISX302 and ISX304) were used for this evaluation. Each SOL was cast on coupons of ISX302 and ISX304 affixed onto wafers to form Film 1 and Film 2, respectively. These coupons were evaluated for coating defects as de-wet spots, black dots or white dots using SEM tool (FIG. 18). JSR ISX302 or ISX304 SiARC was coated on a Si wafer and baked at 220° C./90 s in $N_2$. This wafer was separated into smaller coupon pieces and affixed onto a Si wafer. These novel solutions were then coated as 8 nm FT onto the coupons with the SiARC film and baked at 250° C./2 min in air. The reference block copolymer solution (ref SOL 2) was then coated and baked at 250° C./30 min in $N_2$ as a 47 nm FT. The naming of the solutions mirrors the naming of the examples thus SOL 1, SOL 17 to SOL 25 are solutions formed from the Examples 1 and 17 to 25 and SOL COMP 3 is a sample formed from Comparative Example 3.

Figure 19:
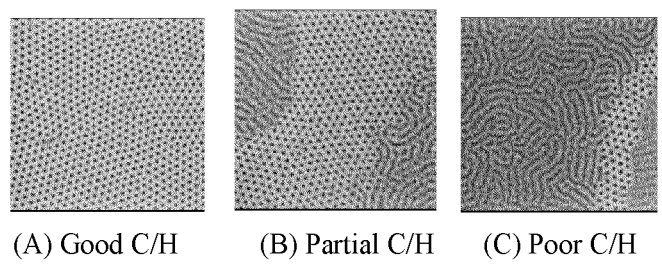

General Defect Analyses Procedure:

Defect Analyses were done by scanning on a Applied Materials NanoSem 3D tool with a procedure to collect SEM images for 2 fields of view (F0V0.5 & FOV10). Two sets of SEM analyses were done. FIG. 18 shows the SEM images of coating the novel compositions on the SiARC films Defect images were evaluated as de-wet white spots, light white spots, barely noticeable white spots or no noticeable white spots. FIG. 19 shows the SEM images of coating the ref SOL 2 on the novel composition films Defect images were evaluated as good, partial, or poor formations of contact holes morphologies as a result of the neutrality of the film. SOL COMP 3 was made with AIBN-OH initiator to be comparable to the new compositions; however, no VBA was added. The inclusion of VBA showed improved de-wet performance on both SiARC coatings for all novel compositions with the exception of SOL 24. The low hydrophobicity of SOL 24 is likely the cause of this observation. Varying the VBA content from 1% to 3% showed the coatings on SiARC remain defect-free. The quality of the contact holes morphologies is dependent on the overall neutrality of the composition. 1% VBA is sufficient to give defect-free coatings on SiARC (SOL 17 and SOL 18); however, more hydrophobicity is needed for better contact holes. When too much VBA is in the composition as in SOL 25, more collapse of the contact holes was observed. Higher hydrophobicity showed better performance as 2% VBA is added into the compositions in both SiARC defectivity and contact holes morphology (SOL 20, SOL 21 and SOL 22).

Table 6 summarizes the performance of compositions containing these materials as neutral layers which were processed as described above:

Two different SiARCs (ISX302 and ISX304) were used for this evaluation. Each SOL was cast on coupons of ISX302 and ISX304 affixed onto wafers to form Film 1 and Film 2, respectively. These coupons were evaluated for coating defects as de-wet spots, black dots or white dots using SEM tool as shown in FIG. 18. In Table 6 the ratings for coat-ability on the novel neutral layers on the SiARC are illustrated in FIG. 18 and are as follows: A SEM image with white spots was rated De-wet defects (X). A SEM image with light white spots was rated Slight defects (V). A SEM image with barely noticeable white spots was rated Very Slight defects (Δ). A SEM image with no noticeable spots was rated No defects (O).

In Table 6 the block copolymer solution for Reference Block Copolymer Synthesis Example 2 was separately coated onto coupons of Film 1 and Film 2 affixed onto wafers and annealed to give morphologies for Coating 1 and Coating 2, respectively. These coupons were evaluated for morphologies using a SEM tool.

In Table 6 summarizes the results observed upon SEM imaging for the coating ability of the novel neutral layers on different SiARC coatings, and the ability of the neutral layer formed to affect contact hole self-assembly in an overlying block copolymer (ref SOL 2). In this table observed SEM images with >90% contact hole morphology were rated Good C/H (A). A SEM image with 50-89% contact hole morphology was rated Partial C/H (B). A SEM image with 0-49% contact hole morphology was rated Poor C/H (C). These ratings of contact morphology are illustrated using representative examples in FIG. 19.

As can be seen in this Table tetrapolymer of P(S-r-VBCB-r-MMA-r-VBA)-OH generally give better compatibility with different types of SiARC than SOL COMP 3 both in term of coating defects and contact hole self-assembly of the overlying annealed film of ref SOL 2 (Reference Block Copolymer Synthesis Example 2). Also, SOL 24 which contained 13 mole % of a repeat unit derived from styrene gave both very poor coating compatibility on all SiARC's tested and also gave poor self-assembly of an overlying annealed film of Reference Block Copolymer Synthesis Example 2. This confirms the need of a higher content of styrene for the P(S-r-VBCB-r-MMA-r-VBA)-OH polymers. Also in Table 3 it was seen that SOL COMP 3 a formulation which exclude the repeat unit based on 4-vinylbenzoic acid, gave poorer compatibility with different SiARC.

TABLE 6

Summary of performance and testing of neutral surface P(S-r-VBCB-r-MMA-r-VBA)-OH

| Sample | Film 1 Film on ISX302 | Film 2 Film on ISX304 | Neutrality | Morphology BCP Coating of Film 1 | BCP Coating of Film 2 |
|---|---|---|---|---|---|
| SOL COMP 3 | X | V | Y | B | A |
| SOL 1 | O | O | Y | B | A |
| SOL 17 | O | O | Y | A | A |
| SOL 18 | O | Δ | Y | B | C |
| SOL 19 | Δ | O | Y | B | C |
| SOL 20 | O | O | Y | A | A |
| SOL 21 | O | O | Y | A | A |
| SOL 22 | O | O | Y | A | A |
| SOL 23 | Δ | O | Y | A | A |
| SOL 24 | X | X | Y | C | C |
| SOL 25 | O | O | Y | B | C |

X = De-wet defects
V = Slight defect
Δ = Very Slight defects
O = No defects
A = Good C/H
B = Partial C/H
C = Poor C/H Although the disclosed and claimed subject matter has been described and illustrated with a certain degree of particularity, it is understood that the disclosure has been made only by way of example, and that numerous changes in the conditions and order of steps can be resorted to by those skilled in the art without departing from the spirit and scope of the disclosed and claimed subject matter.

The invention claimed is:

1. A random copolymer of structure (A) comprising,
a carboxylic acid bearing repeat unit of structure (I), wherein $R_{m1}$ is H or a C-1 to C-4 alkyl, and n1 is the total number of this repeat unit; wherein this repeat unit ranges from about 1.0 mole % to about 5.0 mole % in said copolymer;
a 4-vinylbenzocyclobutene derived repeat unit of structure (II), wherein $R_{m2}$ is H or a C-1 to C-4 alkyl, and n2 is the total number of this repeat unit; wherein this repeat unit ranges from about 5.0 mole % to about 35.0 mole % in said copolymer;
a styrenic repeat unit of structure (III), wherein $R_{m3}$ is H or a C-1 to C-4 alkyl, $R_{sty}$ is selected from a H, C-2 to C-8 linear alkyl, and a C-1 to C-4 alkyloxy and n3 is the total number of this repeat units; wherein this repeat unit ranges from about 25 mole % to about 94 mole % in said copolymer;
an alkyl acrylate or alkyl 2-methylenealkanoate derived repeat unit of structure (IV), wherein $R_{m4}$ is H or a C-1 to C-4 alkyl, $R_I$ is a C-1 to C-8 alkyl and n4 is the total number of this repeat unit, wherein this repeat unit ranges from 0 mole % to about 64 mole % in said copolymer;
a hydroxy functionalized alkyl acrylate or alkyl 2-methylenealkanoate derived repeat unit of structure (V), wherein $R_{m5}$ is H or a C-1 to C-4 alkyl, $L_1$ is a C-2 to C-8 alkylene moiety and n5 is the total number of this repeat unit, wherein this repeat unit ranges from 0 mole % to about 3 mole % in said copolymer, and
two end groups as shown in structure (A) one of which is H and the other is a methyl moiety substituted with Rr, $Rr_1$ and $Rr_2$, wherein $Rr_1$, is a C-1 to C-8 alkyl, $Rr_2$ is selected from a C-1 to C-8 alkyl, a C-1 to C-8 alkylene hydroxy moiety (-alkylene-OH), a C-1 to C-8 alkylenecarboxylic acid moiety (-alkylene-$CO_2H$), or a benzylic alcohol comprising moiety of structure (B) wherein ni is an integer ranging from 0 to 5, nia is an integer from 1 to 5, nib is an integer from 1 to 5, and "*" designates the attached point of this moiety,
Rr is a cyano moiety (—CN) or a carbonylalkyl moiety (—C(=O)—Ri), wherein Ri is a C-1 to C-8 alkyl or an aryl moiety; and further
wherein the sum of the individual mole % of repeat units of structure (I), (II), (III), (IV) and (V), is either smaller than or equal to 100 mole % of the total repeat units present in said copolymer:

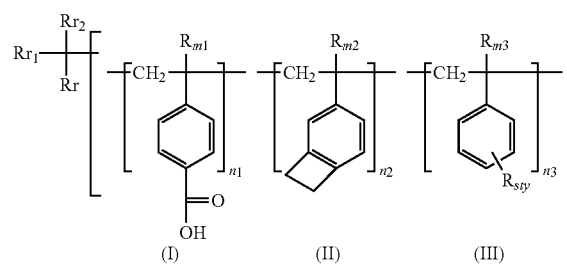

(A)

(I)     (II)     (III)

-continued

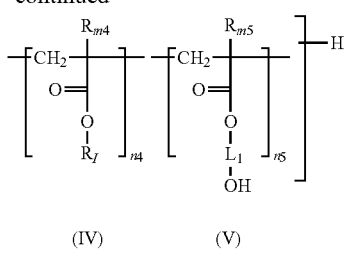

(IV)    (V)

(B)

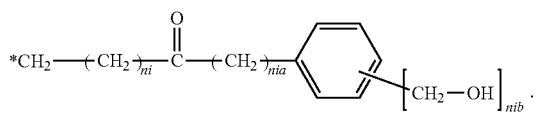

2. The copolymer of claim 1 wherein a styrenic repeat unit of structure (III), ranges from about 30.0 mole % to about 94.0 mole % in said copolymer; and said alkyl acrylate or alkyl 2-methylenealkanoate derived repeat unit of structure (IV), ranges from 0 mole % to about 45 mole %.

3. The copolymer of claim 1, whose repeat units consist of the repeat units of structure (I), (II) and (III), wherein
said repeat unit of structure (I) ranges from about 1 mole % to about 5 mole %,
said repeat unit of structure (II) ranges from about 5 mole % to about 9 mole %,
said repeat unit of structure (III) ranges from about 90 mole % to about 94 mole %, and further where the sum of individual mole % for the repeat units of structures (I), (II) and (III) equals 100 mole % of the total repeat units in said copolymer.

4. The copolymer of claim 1, wherein $R_{sty}$ is H.

5. The copolymer of claim 1, wherein said copolymer has structure (A-1),

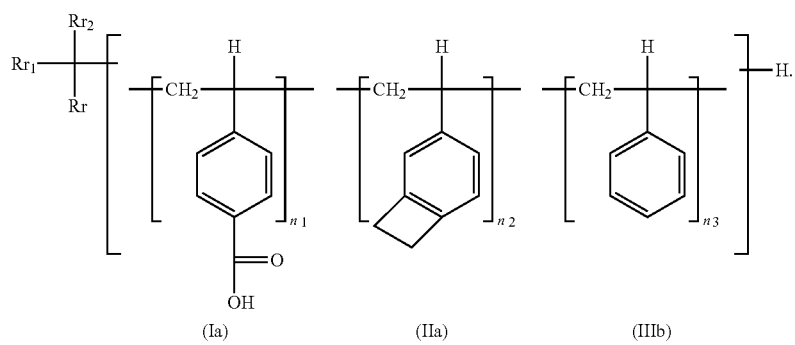

6. The copolymer of claim 1, wherein $Rr_2$ is a C-1 to C-8 alkylene hydroxy moiety.

7. The copolymer of claim 1, wherein $Rr_2$ is a C-1 to C-8 alkylenecarboxylic acid moiety.

8. The copolymer of claim 1, wherein $Rr_2$ is a benzylic alcohol comprising moiety of structure (B).

9. The copolymer of claim 1, which has structure (A-2), wherein
said repeat unit of structure (I) ranges from about 1 mole % to about 5 mole %,
said repeat unit of structure (II) ranges from about 15 mole % to about 35 mole %,
said repeat unit of structure (III) ranges from about 25 mole % to about 69 mole %, and
said repeat unit of structure (IV) ranges from about 5 mole % to about 49 mole %, where further said copolymer is one whose repeat units consist of the repeat units (I), (II), (III) and (IV),

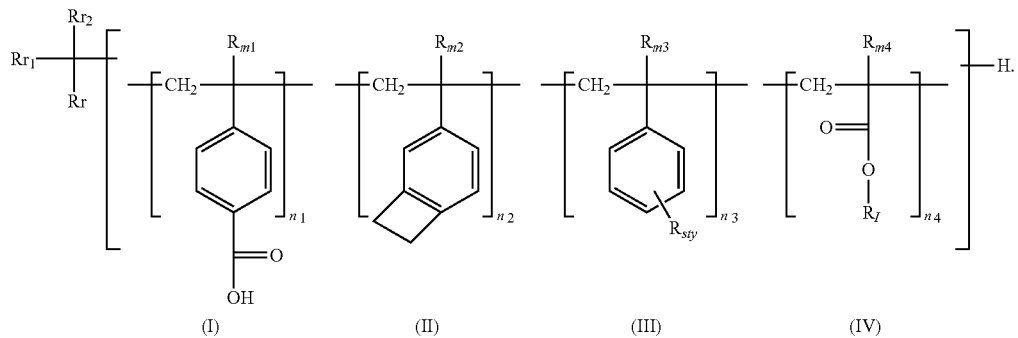

10. The copolymer of claim 9, wherein said copolymer has structure (A-3),

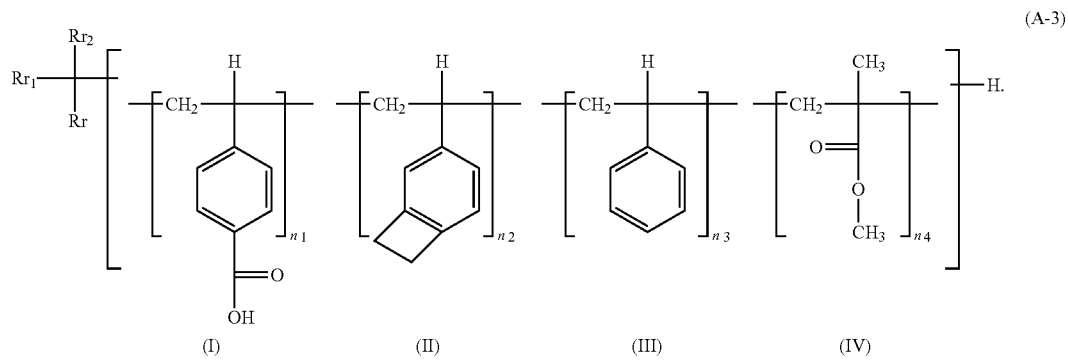

(A-3)

11. The copolymer of claim 9, wherein $Rr_2$ is a C-1 to C-8 alkylene hydroxy moiety.

12. The copolymer of claim 9, wherein $Rr_2$ is a C-1 to C-8 alkylenecarboxylic acid moiety.

13. The copolymer of claim 9, wherein $Rr_2$ is a benzylic alcohol comprising moiety of structure (B).

14. The copolymer of claim 1, which has structure (A), wherein
   said repeat unit of structure (I) ranges from about 1 mole % to about 5 mole %,
   said repeat unit of structure (II) ranges from about 15 mole % to about 35 mole %,
   said repeat unit of structure (III) ranges from about 30 mole % to about 60 mole %,
   said repeat unit of structure (IV) ranges from about 15 mole % to about 45 mole %,
   said repeat unit of structure (V) ranges from about 1 mole % to about 3 mole %,

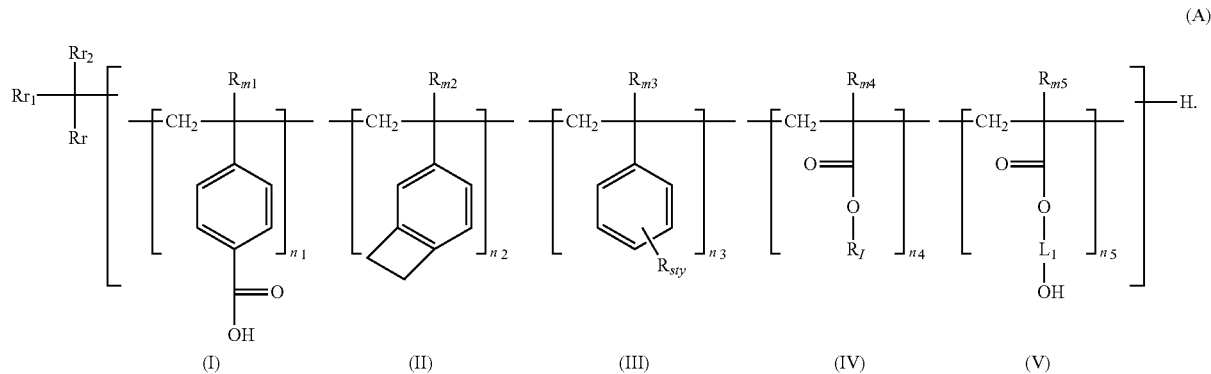

(A)

15. The copolymer of claim 14, wherein said copolymer has structure (A-4),

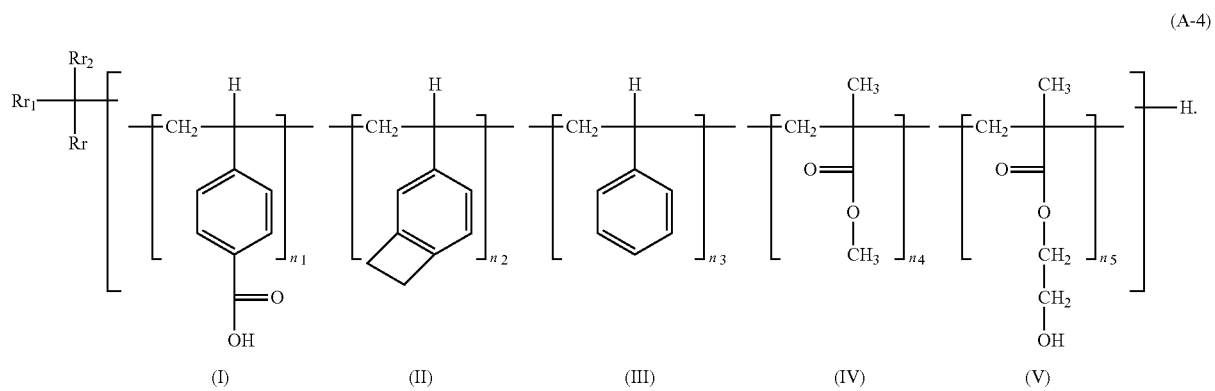

(A-4)

16. The copolymer of claim 14, wherein $Rr_2$ is a C-1 to C-8 alkyl.

17. The copolymer of claim 14, wherein $Rr_2$ is a C-8 alkylene hydroxy moiety.

18. The copolymer of claim 14, wherein $Rr_2$ is a C-1 to C-8 alkylenecarboxylic acid moiety.

19. The copolymer of claim 14, wherein $Rr_2$ is a benzylic alcohol comprising moiety of structure (B).

20. A composition comprising a copolymer of claim 1 and an organic spin casting solvent.

21. A composition comprising a copolymer of claim 6 and an organic spin casting solvent.

22. A composition comprising a copolymer of claim 9, and an organic spin casting solvent, wherein said copolymer is one where $Rr_2$ is either a C-1 to C-8 alkylene hydroxy moiety, a C-1 to C-8 alkylenecarboxylic acid moiety or a is a benzylic alcohol comprising moiety of structure (B).

23. A composition comprising a copolymer of claim 9 and an organic spin casting solvent, wherein said copolymer is one where $Rr_2$ is a C-1 to C-8 alkyl.

24. A composition comprising a copolymer of claim 14 and an organic spin casting solvent.

25. A composition comprising a copolymer of claim 14, wherein in said copolymer $Rr_2$ is either is a C-8 alkylene hydroxy moiety, a C-1 to C-8 alkylenecarboxylic acid moiety, or a benzylic alcohol comprising moiety of structure (B), and an organic spin casting solvent.

26. A composition comprising a copolymer of claim 16 and an organic spin casting solvent.

27. A process for forming a crosslinked or grafted and cross-linked coating of a copolymer on a substrate comprising the steps:
   i) forming a coating of a composition of claim 20 on a substrate,
   ii) heating the coating at a temperature from about 90° C. to about 180° C. to remove solvent and to form a crosslinked or a grafted and crosslinked coating of the copolymer,
   iii) heating the crosslinked or a grafted and crosslinked coating of step ii) from about 200° C. to about 250° C. to form a fully cross-linked or fully crosslinked and grafted copolymer coating.

28. A process for forming a cross-linked or grafted and crosslinked non-polar pinning coating on a substrate comprising the steps:
   ia) forming a coating of a composition of claim 20, where said composition is one where said copolymer is one whose repeat units consist of the repeat units of structure (I), (II) and (III), on a substrate,
   iia) heating the coating at a temperature from about 90° C. to about 180° C. to remove solvent and to form a crosslinked or a grafted and crosslinked coating,
   iiia) heating the crosslinked or a grafted and crosslinked coating of step iia) at a temperature from about 200° C. to about 250° C. to form a fully cross-linked or fully crosslinked and grafted non-polar pinning coating.

29. A process for forming a grafted and crosslinked non-polar pinning coating on a substrate comprising the steps:
   ib) forming a coating of a composition of claim 20, where said composition is one where said copolymer is one whose repeat units consist of the repeat units of structure (I), (II) and (III), on a substrate,
   iib) heating the coating at a temperature from about 90° C. to about 180° C. to remove solvent and to form a crosslinked or a grafted and crosslinked coating,
   iiib) heating the crosslinked or a grafted and crosslinked coating of step iib) at a temperature from about 200° C. to about 250° C. to form a fully crosslinked and grafted non-polar pinning coating.

30. A process for forming a crosslinked non-polar pinning coating on a substrate comprising the steps:
   ic) forming a coating of a composition of claim 20, where said copolymer is one wherein $Rr_2$ is a C-1 to C-8 alkyl, on a substrate,
   iic) heating the coating at a temperature from about 90° C. to about 180° C. to remove solvent and to form a crosslinked coating,
   iiic) heating the crosslinked coating of step iic) at a temperature from about 200° C. to about 250° C. to form a fully crosslinked non-polar pinning coating.

31. A process for forming a cross-linked or grafted and crosslinked neutral coating on a substrate comprising the steps:
   id) forming a coating of a composition of claim 20 on a substrate, where further said copolymer which has structure (A-2), wherein
   said repeat unit of structure (I) ranges from about 1 mole % to about 5 mole %,
   said repeat unit of structure (II) ranges from about 15 mole % to about 35 mole %,
   said repeat unit of structure (III) ranges from about 25 mole % to about 69 mole %, and
   said repeat unit of structure (IV) ranges from about 5 mole % to about 49 mole %,

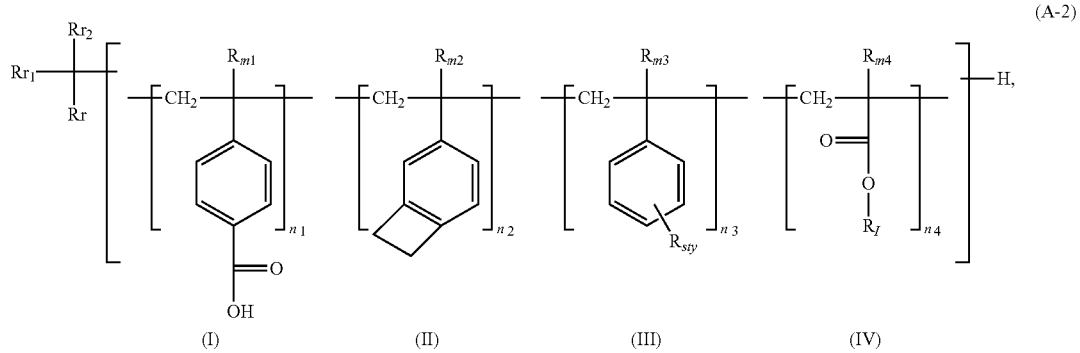

iid) heating the coating at a temperature from about 90° C. to about 180° C. to remove solvent and to form a crosslinked or a grafted and crosslinked coating, iiid) heating the crosslinked coating of step iid) at a temperature from about 200° C. to about 250° C. to form a fully crosslinked non-polar pinning coating.

32. A process for forming a grafted and crosslinked neutral coating on a substrate comprising the steps:
ie) forming a coating of a composition of claim 22 on a substrate,
iie) heating the coating at a temperature from about 90° C. to about 180° C. to remove solvent and to form a grafted and crosslinked coating,
iiie) heating the crosslinked coating of step iie) at a temperature from about 200° C. to about 250° C. to form a fully grafted and crosslinked neutral coating.

33. A process for forming a crosslinked neutral coating on a substrate comprising the steps:
if) forming a coating of a composition of claim 23 on a substrate,
iif) heating the coating at a temperature from about 90° C. to about 180° C. to remove solvent and to form a crosslinked or a grafted and crosslinked coating,
iiif) heating the crosslinked or a grafted and crosslinked coating of step iif) at a temperature from about 200° C. to about 250° C. to form a fully crosslinked neutral coating.

34. A process for forming a cross-linked or grafted and crosslinked neutral coating on a substrate comprising the steps:
ig) forming a coating of a composition of claim 24 on a substrate,
iig) heating the coating at a temperature from about 90° C. to about 180° C. to remove solvent and to form a crosslinked or a grafted and crosslinked coating,
iiig) heating a crosslinked or a grafted and crosslinked coating of step iig) at a temperature from about 200° C. to about 250° C. to form a fully cross-linked or fully grafted and crosslinked neutral coating.

35. A process for forming a grafted and crosslinked neutral coating on a substrate comprising the steps:
ih) forming a coating of a composition of claim 25 on a substrate,
iih) heating the coating at a temperature from about 90° C. to about 180° C. to remove solvent and to form a grafted and crosslinked coating,
iiih) heating the grafted and crosslinked coating of step iih) at a temperature from about 200° C. to about 250° C. to form a fully grafted and crosslinked neutral coating.

36. A process for forming a crosslinked neutral coating on a substrate comprising the steps:
i') forming a coating of a composition of claim 26 on a substrate,
ii') heating the coating at a temperature from about 90° C. to about 180° C. to remove solvent and to form a crosslinked coating,
iii') heating the crosslinked coating of step ii') at a temperature from about 200° C. to about 250° C. to form a fully crosslinked neutral coating.

37. A process for forming a self-assembled block copolymer coating on a neutral coating comprising the steps:
ij) forming neutral coating according to claim 32,
iij) applying a block copolymer over the neutral coating and annealing until directed self-assembly of the block copolymer coating occurs.

38. A process of graphoepitaxy, directed self-assembly of a block copolymer coating used to form an image comprising the steps:
ik) forming neutral coating according to claim 32,
iik) providing a coating of a photoresist coating over the neutral coating, and forming a pattern in the photoresist coating,
iiik) applying a block copolymer comprising an etch resistant block and a highly etchable block over the photoresist pattern and annealing until directed self-assembly occurs; and,
ivk) etching the block copolymer, thereby removing the highly etchable block of the copolymer overcoating areas of the substrate and simultaneously forming a pattern in the substrate selectively in these areas.

39. A process of chemoepitaxy, directed self-assembly of a block copolymer coating used to form an image comprising the steps:
il) forming neutral coating on as substrate according to claim 32,
iil) providing a coating of a photoresist coating over the neutral coating, and forming a pattern in the photoresist coating, thereby forming regions in which the neutral coating is uncovered by the resist,
iiil) treating the uncovered neutral coating to remove it, forming a pinning area,
ivl) removing the photoresist, uncovering the unaffected neutral coating forming a chemoepitaxy pattern containing neutral and pinning areas,
vl) applying a block copolymer comprising an etch resistant block and a highly etchable block over the neutral coating and annealing until directed self-assembly occurs; and
vil) etching the block copolymer, thereby removing the highly etchable block of the copolymer overcoating areas of the substrate and simultaneously forming a pattern in the substrate selectively in these areas.

40. A process of chemoepitaxy, directed self-assembly of a block copolymer coating used to form an image comprising the steps:
im) forming a non-polar pinning coating on a substrate according to claim 28,
iim) providing a coating of a photoresist coating over pinning coating,
iiim) forming a pattern in the photoresist coating, thereby forming regions in which the pinning coating is uncovered by the resist,
ivm) treating the uncovered pinning coating to remove it, forming a bare substrate areas,
vm) removing the photoresist, uncovering both the unaffected pinning coating and the bare areas of substrate,
vim) applying a neutral coating in the areas of bare substrate forming a chemoepitaxy pattern containing neutral and pinning areas,
viim) applying a block copolymer comprising an etch resistant block and a highly etchable block over the chemoepitaxy pattern and annealing until directed self-assembly occurs; and
viiim) etching the block copolymer, thereby removing the highly etchable block of the copolymer overcoating areas of the substrate and simultaneously forming a pattern in the substrate selectively in these areas.

* * * * *